(12) United States Patent
Lin

(10) Patent No.: US 9,895,018 B2
(45) Date of Patent: Feb. 20, 2018

(54) AUTOMATIC MEAL SERVING SYSTEM

(71) Applicant: CHEF Automation Co. Ltd., Taipei OT (TW)

(72) Inventor: Chyi-Yeu Lin, Taipei (TW)

(73) Assignee: CHEF Automation Co. Ltd., Taipei (TW)

(*) Notice: Subject to any disclaimer, the term of this patent is extended or adjusted under 35 U.S.C. 154(b) by 902 days.

(21) Appl. No.: 14/322,921

(22) Filed: Jul. 3, 2014

(65) Prior Publication Data

US 2015/0013550 A1   Jan. 15, 2015

(30) Foreign Application Priority Data

Jul. 3, 2013  (TW) .............................. 102123849 A

(51) Int. Cl.
| | |
|---|---|
| *A47J 37/00* | (2006.01) |
| *A47J 27/12* | (2006.01) |
| *A47J 37/12* | (2006.01) |
| *A47J 37/04* | (2006.01) |
| *A47F 10/06* | (2006.01) |
| *E04H 3/04* | (2006.01) |

(Continued)

(52) U.S. Cl.
CPC .............. *A47J 27/12* (2013.01); *A47F 10/06* (2013.01); *A47J 36/20* (2013.01); *A47J 37/04* (2013.01); *A47J 37/1228* (2013.01); *E04H 3/04* (2013.01); *G07F 17/0064* (2013.01); *G07F 17/0078* (2013.01)

(58) Field of Classification Search
CPC ....... A47J 37/1228; A47J 37/049; A47J 37/04; B65G 47/61; B65G 39/00; B65G 39/10
USPC ...................... 99/357, 484; 138/468.6, 468.3; 198/468.6, 468.3
See application file for complete search history.

(56) References Cited

U.S. PATENT DOCUMENTS

| | | | | |
|---|---|---|---|---|
| 4,919,950 A | | 4/1990 | Mak | |
| 4,944,218 A | * | 7/1990 | Cresson | G07F 17/0078 99/334 |
| 5,425,307 A | * | 6/1995 | Rush | B26D 3/22 83/404.1 |
| 5,477,778 A | * | 12/1995 | Kuwahara | A47F 10/06 186/42 |
| 5,540,943 A | * | 7/1996 | Naramura | A21C 9/04 426/231 |

(Continued)

FOREIGN PATENT DOCUMENTS

| | | |
|---|---|---|
| CN | 101467837 | 7/2009 |
| CN | 100588328 | 2/2010 |

(Continued)

OTHER PUBLICATIONS

"Office Action of China Counterpart Application", dated Mar. 1, 2016, p. 1-p. 8.

(Continued)

*Primary Examiner* — Reginald L Alexander
(74) *Attorney, Agent, or Firm* — JCIPRNET

(57) ABSTRACT

An automatic meal serving system includes a conveyer module, a transporting module, a first food serving and heating module, and an ingredient serving module. The transporting module is located on the conveyer module for sequentially positioning a plurality of vessels on the conveyer module. The first food serving and heating module provides a variety of foods, heats one of the foods that is chosen, and feeds one of the vessels on the conveyer module with the heated food. The ingredient serving module is located beside the first food serving and heating module. The transporting module, the first food serving and heating module, and the ingredient serving module are sequentially located along the conveyer module.

17 Claims, 29 Drawing Sheets

(51) Int. Cl.
*A47J 36/20* (2006.01)
*G07F 17/00* (2006.01)

(56) References Cited

U.S. PATENT DOCUMENTS

| | | | |
|---|---|---|---|
| 6,112,645 | A | 9/2000 | Chang |
| 6,581,727 | B1 * | 6/2003 | Tokuno .................. A47F 10/06 186/49 |
| 7,174,830 | B1 * | 2/2007 | Dong ..................... B25J 9/0084 901/1 |
| 7,478,749 | B2 * | 1/2009 | Clothier ................ B65G 54/02 222/52 |
| 8,459,442 | B2 * | 6/2013 | Morimoto ......... H01L 21/67727 198/346.3 |

FOREIGN PATENT DOCUMENTS

| | | |
|---|---|---|
| CN | 102273912 | 12/2011 |
| CN | 102548454 | 7/2012 |
| CN | 202495105 | 10/2012 |
| CN | 202588160 | 12/2012 |
| CN | 202775656 | 3/2013 |
| CN | 103142115 | 6/2013 |
| EP | 1125528 | 8/2001 |
| EP | 1166688 | 7/2004 |
| JP | S63139513 | 6/1988 |
| TW | 200924678 | 6/2009 |
| TW | M448970 | 3/2013 |

OTHER PUBLICATIONS

"Office Action of Taiwan Counterpart Application No. 104103417," dated Sep. 18, 2015, p. 1-p. 3.
"Office Action of Taiwan Counterpart Application No. 104103711," dated Oct. 16, 2015, p. 1-p. 3.
"Office Action of China Related Application No. 201610325989.2," dated Aug. 9, 2017, p. 1-p. 10.
"Office Action of Taiwan Counterpart Application", dated Nov. 28, 2014, p. 1-p. 5.

* cited by examiner

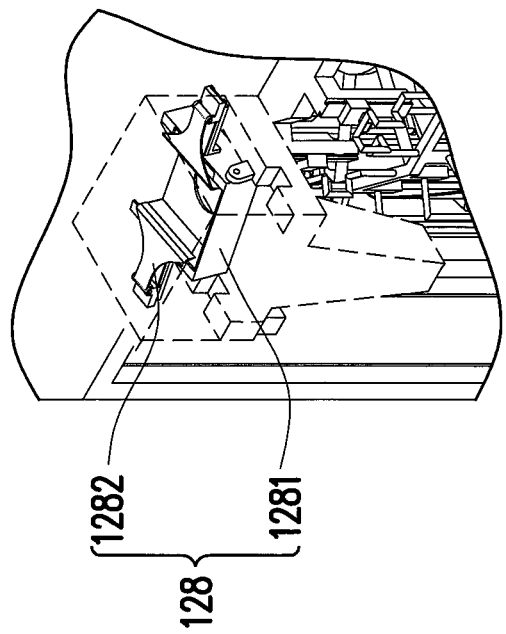
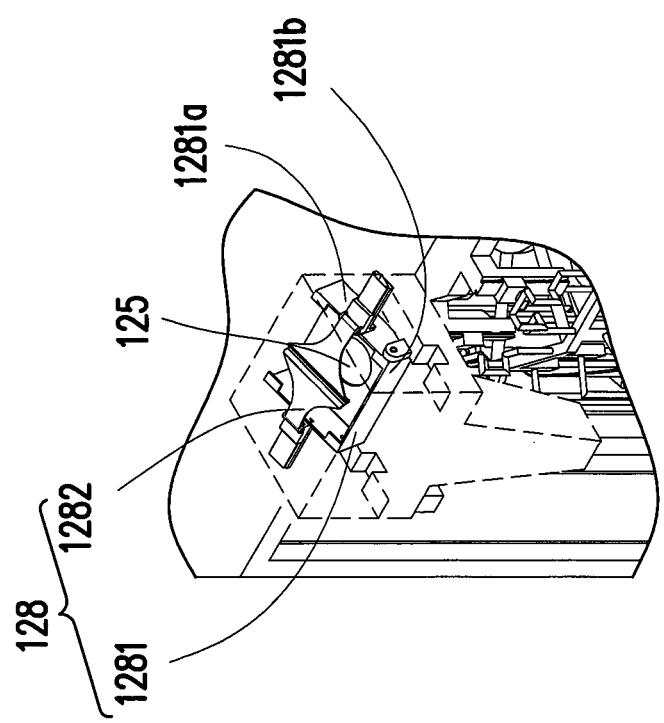
FIG. 4A
FIG. 4B

AUTOMATIC MEAL SERVING SYSTEM

CROSS-REFERENCE TO RELATED APPLICATION

This application claims the priority benefit of Taiwan application serial no. 102123849, filed on Jul. 3, 2013. The entirety of the above-mentioned patent application is hereby incorporated by reference herein and made a part of this specification.

FIELD OF THE INVENTION

The invention relates to a meal serving system and particularly relates to an automatic meal serving system.

DESCRIPTION OF RELATED ART

People, if not cooking their own meals at home, eat out at restaurants or cafeterias or buy raw food, prepared food, or fresh made food from food stands, bakeries, or convenient stores. Most people who eat out are accustomed to fresh made food which may be bought mostly from restaurants and cafeterias. Popular staple foods in different countries include bread, potatoes, rice, corns, noodles, rice noodles, flat rice noodles, spaghetti, dumplings, etc., among which noodles, rice noodles, flat rice noodles, spaghetti, and dumplings can be quickly cooked. Therefore, restaurants and cafeterias in many countries often serve noodle-based meals, and such meals generally include staple food and ingredients. For instance, in Taiwan, beef noodles, dumpling noodles, Chinese bean-paste noodles, dumplings, and beef soup dumplings are easy and simple meals and are very popular. In addition to the ingredients (e.g., beef, dumplings, bean paste, etc.), there are many options for noodles, and the traditional noodles made by wheat may be replaced by rice noodles or flat rice noodles. Besides, the heated dumplings may be eaten with or without soup. On the whole, a noodle-based meal is inexpensive and efficient. However, not all of the cooks can prepare delicious and tasty noodle-based meals, and the hygienic-sanitary conditions of food prepared by different food stands and food stores are not consistently satisfactory, which may result in food contamination or even lead to disease.

An ideal noodle-based meal should be freshly cooked and promptly heated on site by a top cook on perfect hygienic-sanitary conditions, and the noodles and the ingredients are well prepared in advance. In response thereto, an automatic (unmanned) meal serving system can ideally load the food and the ingredients prepared in advance by the top cooks and well packaged to meet hygienic-sanitary requirements, automatically accept orders from customers, spontaneously remove the packaging materials and cook the food and the ingredients, feed vessels with the cooked food, and transport the vessels with the cooked food to a meal pick-up area. Such an automatic meal serving system ensures the consistently high quality of the meals served without the need to hire on-site cooks and complies with high hygienic-sanitary standards because all the food and ingredients are not touched by human beings, and therefore the automatic meal serving system can meet the requirements of the modern society.

SUMMARY OF THE INVENTION

The invention is directed to an automatic meal serving system that can serve meals quickly as well as comply with hygienic-sanitary standards.

In an embodiment of the invention, an automatic meal serving system for serving diverse meals includes a conveyer module, a transporting module, a first food serving and heating module, and an ingredient serving module. The transporting module is adapted for sequentially positioning a plurality of vessels on the conveyer module one by one. The first food serving and heating module is adapted for providing a variety of foods, heating one of the foods that is chosen, and feeding one of the vessels on the conveyer module with the heated food. The ingredient serving module is located at a meal pick-up area beside the first food serving and heating module. The transporting module, the first food serving and heating module, and the meal pick-up area beside the ingredient serving module are sequentially located along the conveyer module.

In view of the above, the automatic meal serving system capable of performing various functions allows the owner to select the actual required functions to be performed at will according to the estimated costs. Besides, no manpower is required in the entire process of heating the food and the ingredients and feeding the vessel with the heated food; therefore, the food and the ingredients can be protected from contamination, and the food safety can be secured. Labor costs can also be significantly reduced because no manpower is required by the automatic meal serving system. Moreover, programs in the system can automatically arrange the order of serving the meals according to the preparation time of individual meals, such that customers are able to pick up their meals in an efficient manner.

Several exemplary embodiments accompanied with figures are described in detail below to further describe the invention in details.

BRIEF DESCRIPTION OF THE DRAWINGS

FIG. 4A to FIG. 4D are schematic diagrams illustrating a packaging material removal module which removes the packaging material.

DETAILED DESCRIPTION OF DISCLOSED EMBODIMENTS

Several embodiments of an automatic meal serving system are provided below. The automatic meal serving system is able to automatically perform a heating and cooking function and a meal serving function; in addition, during selection and preparation of food and ingredients and in the process of cooking and serving the meals, no human beings may touch or even contaminate the food and the ingredients, so as to satisfy hygienic-sanitary requirements. Besides, the automatic meal serving system requires no manpower and thus significantly reduces labor costs.

First Embodiment

Figure 1:
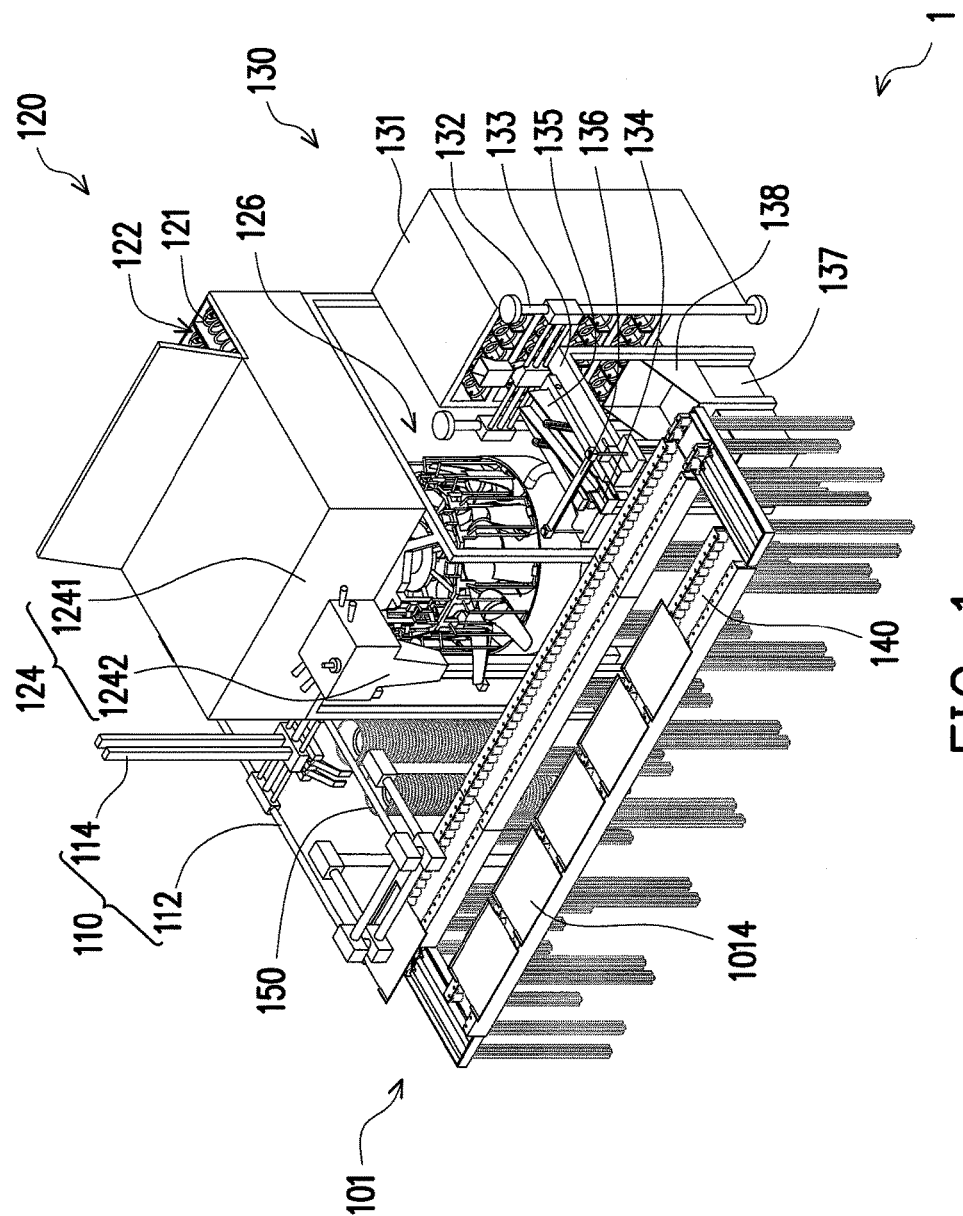
FIG. 1 is a schematic diagram illustrating an automatic meal serving system according to a first embodiment of the invention.

FIG. 1 is a schematic diagram illustrating an automatic meal serving system according to a first embodiment of the invention. With reference to FIG. 1, the automatic meal serving system 1 includes a conveyer module 101, a transporting module 110, a first food serving and heating module 120, and an ingredient serving module 130. The transporting module 110, the first food serving and heating module 120, and the ingredient serving module 130 are sequentially located along the conveyer module 101, and a meal pick-up area 140 is defined on the conveyer module 101. Vessels 150 (shown in FIG. 2) holding food may be temporarily placed on the meal pick-up area 140, so that customers can pick up the meal.

Figure 2:
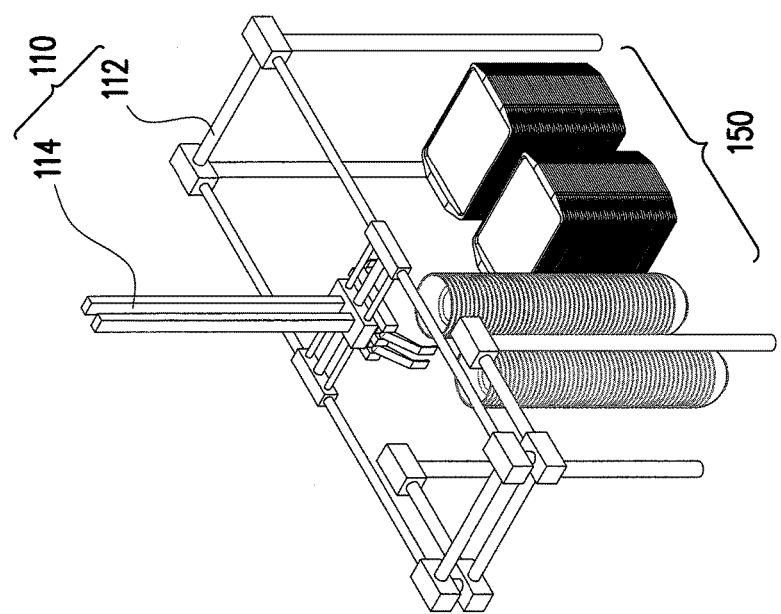
FIG. 2 is a schematic diagram illustrating a transporting module and vessels.

FIG. 2 is a schematic diagram illustrating a transporting module and vessels. With reference to FIG. 1 and FIG. 2, the transporting module 110 is configured to be movable to the top of the conveyer module 101, and the transporting module 110 described herein includes a shelf 112 and a clamping claw 114. The shelf 112 is placed next to the first food serving and heating module 120 and the conveyer module 101 and is assembled by a plurality of shaft members. The vessels 150 that hold food may be placed below the shelf 112, so that the clamping claw 114 is able to pick up the vessels 150. Each vessel 150 may be a bowl or a combination of a dinner plate and a bowl. The clamping claw 114 is placed on the shelf 112 and may move horizontally or vertically along the shelf 112, so as to pick up the vessels 150 and sequentially place the vessels 150 to the conveyer module 101. In another embodiment that is now shown in the drawings, the transporting module 110 may be replaced by a mechanical arm. Certainly, the components in the transporting module 110 are not limited to the shelf 122 and the clamping claw 114, and other components that can achieve the same effects may be implemented as well. For instance, the function of placing the vessels 150 on the conveyer module 101 may be performed by many ways, e.g., by using a multi joint mechanical arm, a linear mechanical arm, or a mechanism that allows only one of the overlying vessels 150 to be placed on the conveyer module 101 at a time.

Figure 3:
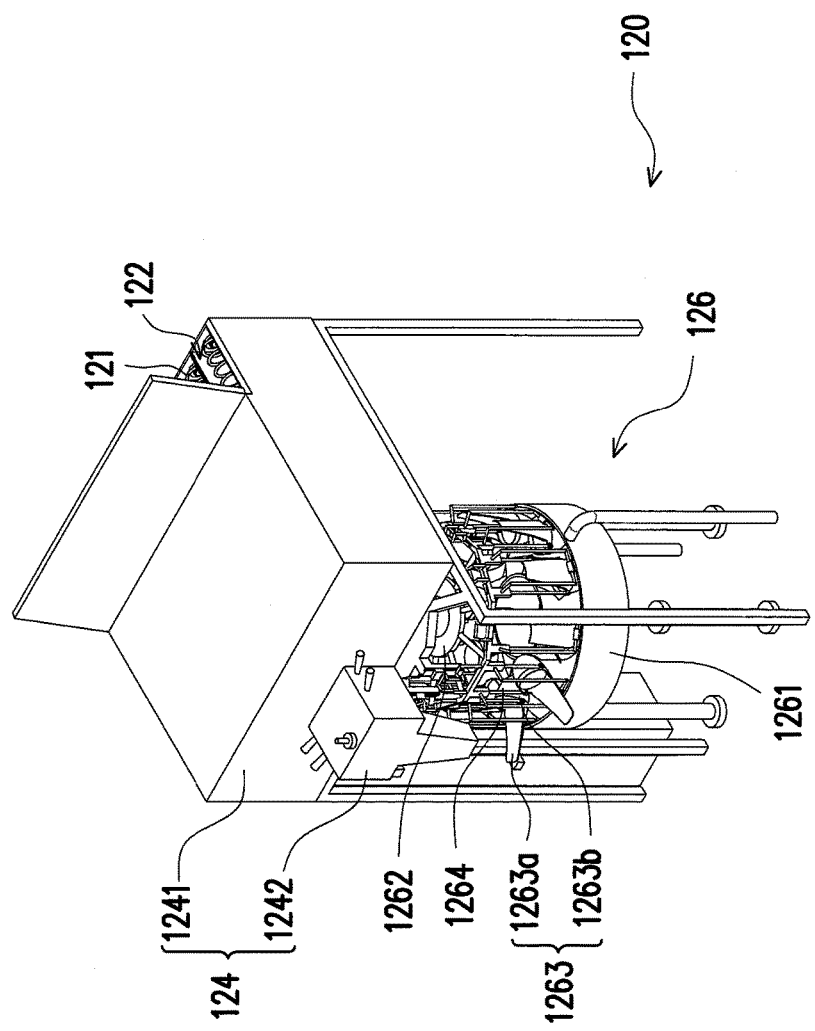
FIG. 3 is a schematic diagram illustrating a first food serving and heating module.

FIG. 3 is a schematic diagram illustrating a first food serving and heating module. With reference to FIG. 1 and FIG. 3, the first food serving and heating module 120 may be placed along the transporting path of the conveyer module 101 and may adjoin the shelf 112. Here, the first food serving and heating module 120 is configured to provide a variety of foods 2000 (shown in FIG. 21), heat one of the foods 2000 that is chosen, and feed one of the vessels 150 on the conveyer module 101 with the heated food 2000. The conveyer module 101 keeps on conveying the vessel 150.

Figure 21:
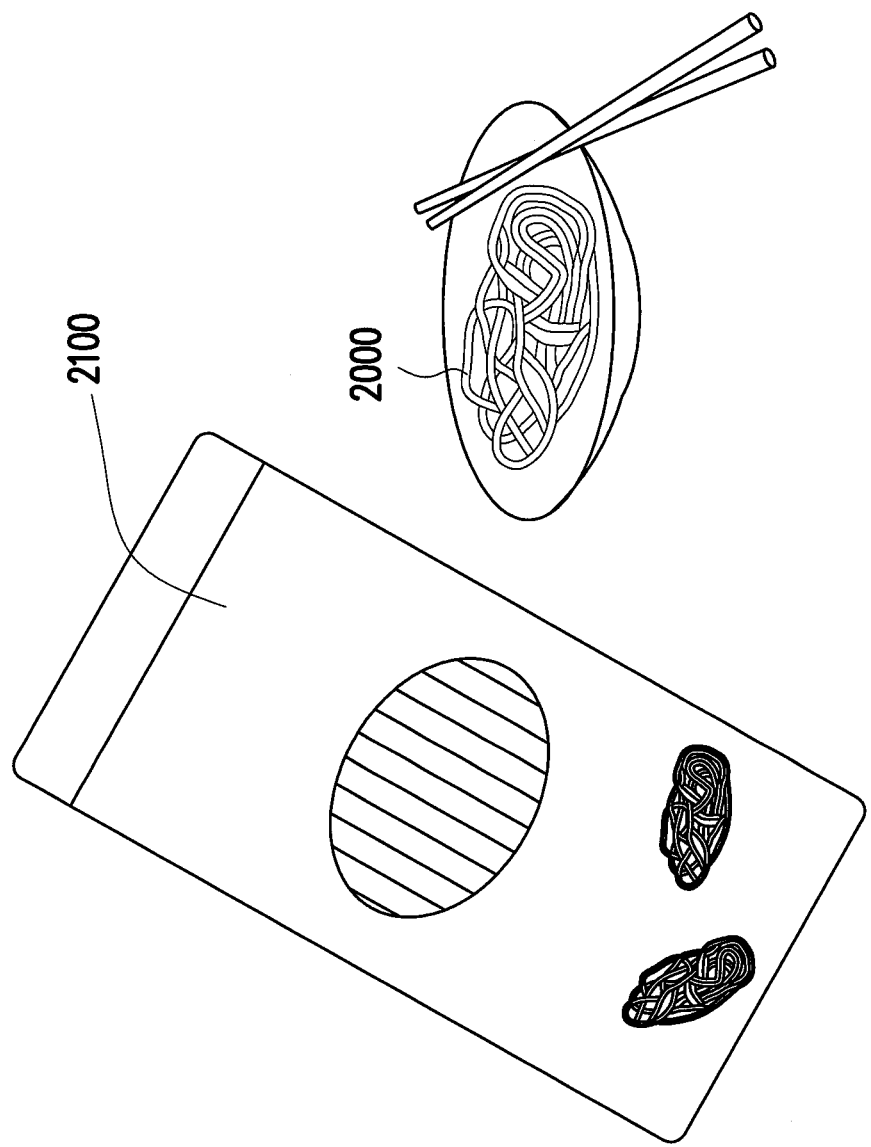
FIG. 21 schematically shows food wrapped by a packaging material.

Specifically, the first food serving and heating module 120 includes at least one food serving tank 122, an ingredient feeding and guiding tank 124, and a heating unit 126. Each food serving tank 122 has one of the foods 2000 (as shown in FIG. 21) which may be noodles, green-bean noodles, rice noodles, flat rice noodles, or any other noodle-like staple; however, the invention is not limited thereto. Each food serving tank 122 is controlled to remain at a constant temperature, so as to keep the food fresh for a longer period of time. The front end of each food serving tank 122 is connected to the ingredient feeding and guiding tank 124, and the heating unit 126 is placed below the ingredient feeding and guiding tank 124. Each food serving tank 122 further has a food and ingredient separating pusher 121 therein, and each food in the same food serving tank 122 is separated from each other by the food and ingredient separating pusher 121. The food and ingredient separating pusher 121 has a spiral-like shape, and the foods 2000 as shown in FIG. 21 are separated by the spirals. Once the food and ingredient separating pusher 121 rotates at one revolution at a time, the food is pushed one step forward. The food serving tank 122 can be designed to have a drawer-like shape, and the drawer-like food serving tank 122 may be pulled backward for food supply.

The ingredient feeding and guiding tank 124 has an L-shaped side surface. An inclined first portion 1241 connected to the front end of each food serving tank 122 receives the food 2000 (as shown in FIG. 21) pushed out by the food and ingredient separating pusher 121 and guides the food 2000 to the vertical second portion 1242, so as to place the food 2000 (as shown in FIG. 21) into the heating unit 126 and heat the food 2000.

The food 2000 (as shown in FIG. 21) may be further wrapped by a packaging material 2100 (as shown in FIG. 21); in response thereto, the first food serving and heating module 120 further includes a packaging material removal module 128 configured in the ingredient feeding and guiding tank 124. FIG. 4A is a schematic diagram illustrating a packaging material removal module. With reference to FIG. 4A, the packaging material removal module 128 includes a holder 1281 and a pair of rakes 1282. The holder 1281 serves to hold the food 2000 entering the ingredient feeding and guiding tank 124. Here, the holder 1281 has a first side 1281a and a second side 1281b. The second side 1281b is pivoted to the ingredient feeding and guiding tank 124, such that the first side 1281a is able to rotate along the second side 1281b as a rotation axis, and the holder 1281 is turned over. The rakes 1282 are located at two respective sides of the holder 1281 and can be relatively close to or away from the holder 1281, so as to strip off the packaging material 2100 of the food 2000 on the holder 1281. A negative pressure supplying device 125 may be further configured below the holder 1281 for providing a negative pressure to absorb the packaging material 2100 wrapping the food 2000 when the holder 1281 holds the chosen food 2000, and thereby the rakes 1281 can easily strip off the packaging material 2100. Besides, a packaging material collecting tank 127 can be further configured below the ingredient feeding and guiding tank 124 for collecting the packaging material 2100 when the first side 1281a of the holder 1281 is rotated to a location corresponding to the packaging material collecting tank 127. Here, the negative pressure supplying device 125 can be installed into the packaging material collecting tank 127 to make sure that the packaging material 2100 falls into the packaging material collecting tank 127. The negative pressure supplying device 125 may also be an air pump directly placed below the holder 1281 upon the actual demand.

With reference to FIG. 1 and FIG. 3, the heating unit 126 includes a water tank 1261, a rotator 1262, and a plurality of food heating baskets 1263. The water tank 1261 is adapted for providing hot water, and the rotator 1262 is rotatably configured above the water tank 1261. The food heating baskets 1263 are connected to the rotator 1262 and are arranged in a radial manner. One of the food heating baskets 1263 is aligned to the ingredient feeding and guiding tank 124, so as to receive the food 2000 from the ingredient feeding and guiding tank 124. In the present embodiment, the weight of the pouring portion 1263a of each food heating basket 1263 is greater than the weight of the basket portion 1263b of each food heating basket 1263. Therefore, if the food 200 does not fall into the food heating baskets 1263, the food heating baskets 1263 spontaneously lean against the water tank 1261.

It is also likely to arrange a plurality of lifting members 1264, and each of the food heating baskets 1263 is connected to the rotator 1262 through the corresponding lifting member 1264. Therefore, the movement of each lifting member 1264 relative to the rotator 1262 can drive the corresponding food heating basket 123 to be in an upright or inclined position.

Figure 5A:
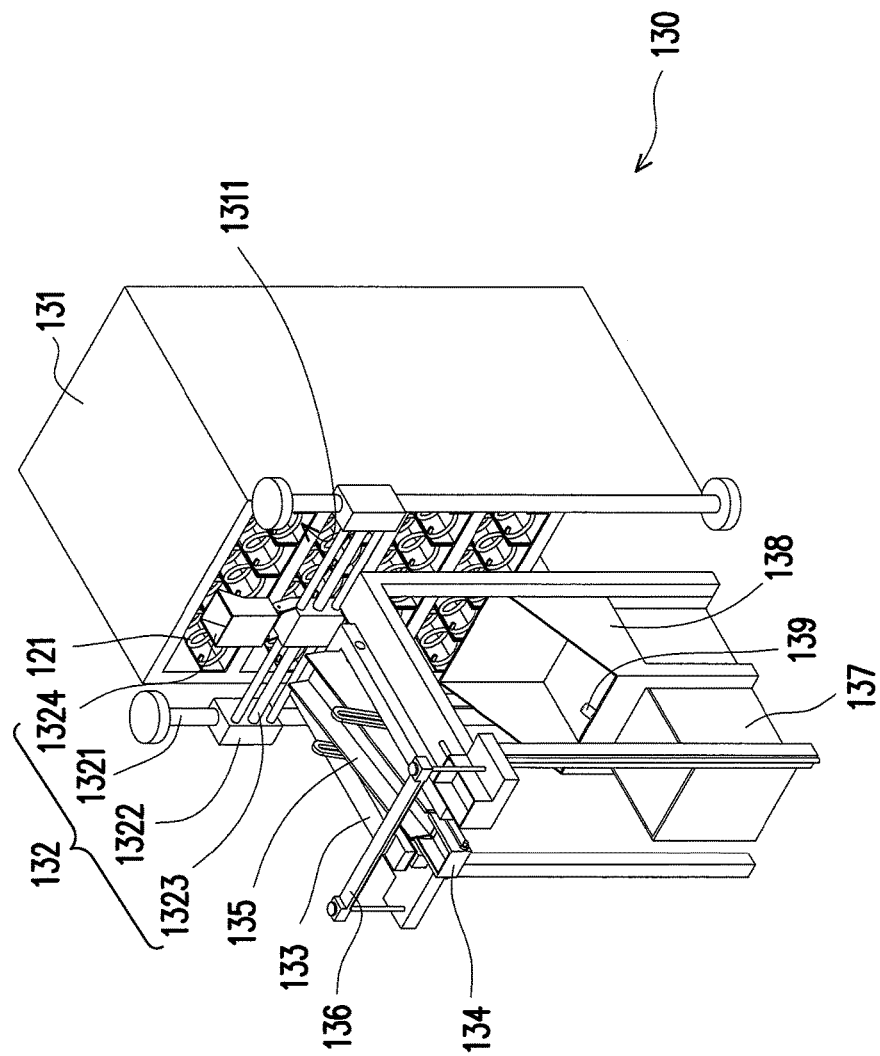
FIG. 5A is a schematic diagram illustrating an ingredient serving module.
Figure 5B:
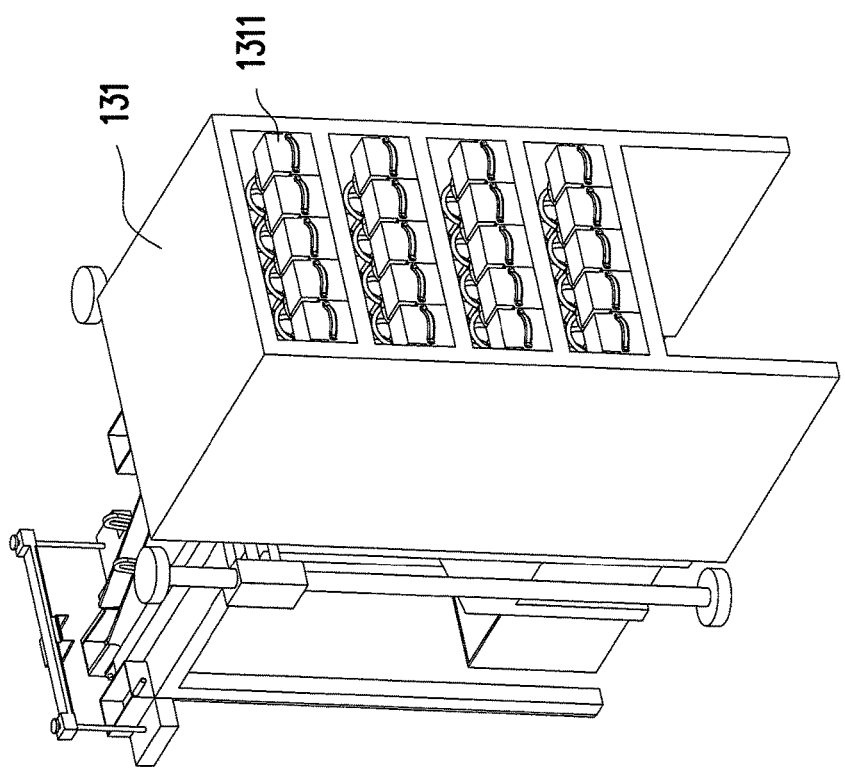
FIG. 5B is a schematic diagram illustrating the ingredient serving module depicted in FIG. 5A at another view angle.
Figure 22:
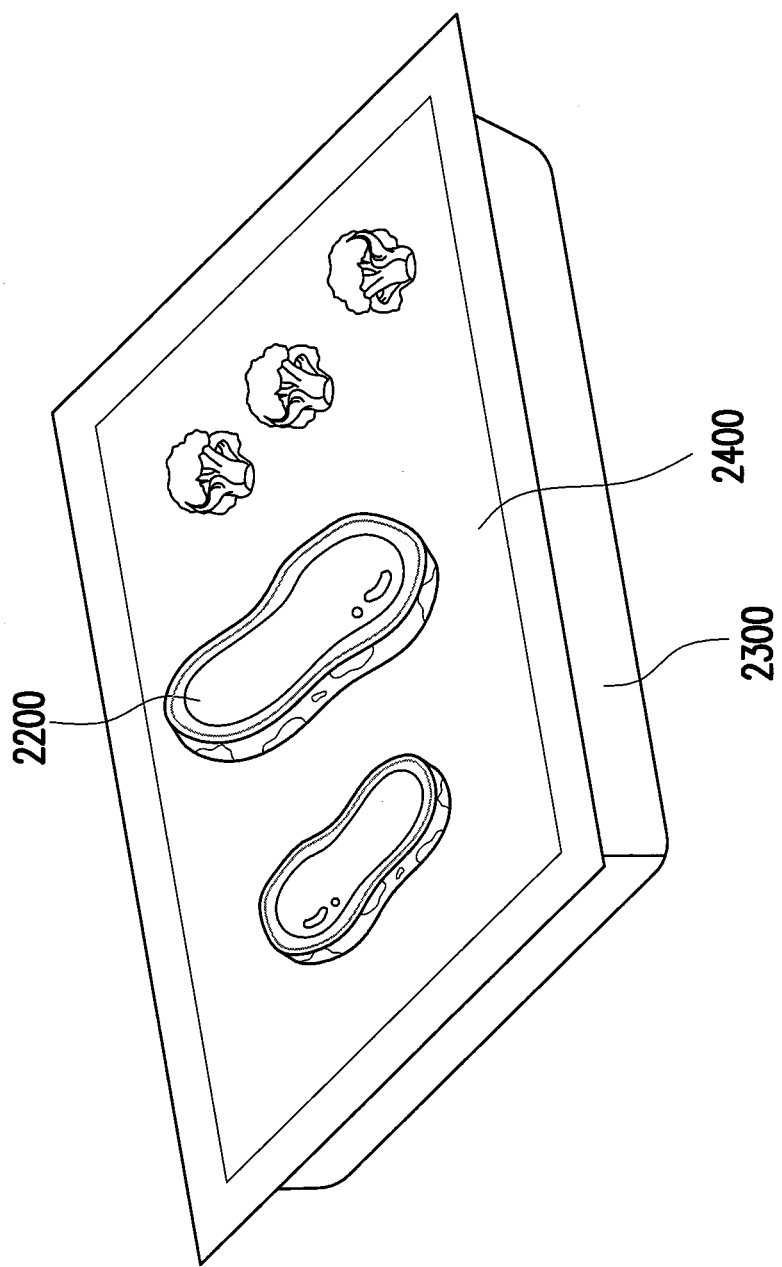
FIG. 22 schematically shows ingredients placed in a box and sealed by a box wrap.

FIG. 5A is a schematic diagram illustrating an ingredient serving module, and FIG. 5B is a schematic diagram illustrating the ingredient serving module depicted in FIG. 5A at another view angle. With reference to FIG. 1, FIG. 5A, and FIG. 5B, the ingredient serving module 130 is located next to a food heating module 120 and includes an ingredient serving cabinet 131, an ingredient serving device 132, a table 133, an ingredient processing container 134, a sliding rail 135, and a cutter 136. The ingredient serving cabinet 131 has ingredient serving tanks 1311 arranged in columns and rows, and the same kind of ingredients 2200 packaged in boxes 2400 is placed in respective ingredient serving tanks 1311, as shown in FIG. 22, so as to seal the ingredients 2200 into the boxes 2400 by a box wrap (shown in FIG. 22). Here, the ingredients 2200 packaged in boxes 2400 may be dried ingredients or may be a mixture of dried and soup-based ingredients. For the purpose of easy supply, the ingredient serving tanks 1311 may also be shaped as drawers. Each ingredient serving tank 1311 may further have a food and ingredient separating pusher 121 (the same as that of the food serving tank 122) therein, so as to push out the boxes 2400 containing the ingredients 2200. Similarly, to effectively preserve the ingredients 2200 for a long period of time, the ingredient serving cabinet 131 is controlled to remain at a constant temperature.

With reference to FIG. 1, FIG. 5A, and FIG. 5B, the ingredient serving device 132 includes a pair of vertical guiding posts 1321, a pair of sliding blocks 1322, at least one horizontal shaft 1323, and an ingredient feeding box 1324. The vertical guiding posts 1321 are configured in front of the ingredient serving cabinet 131 and inserted into the sliding blocks 1322. The horizontal shaft 1323 passes through the two sliding blocks 1322, and the ingredient feeding box 1324 is configured on the horizontal shaft 1323. Here, the location of the sliding blocks 1322 on the vertical guiding posts 1321 and the location of the ingredient feeding box 1324 on the horizontal shaft 1323 determine the ingredient serving tank 1311 corresponding to the ingredient feeding box 1324. The table 133 is located between the conveyer module 101 and the ingredient serving cabinet 131, and the ingredient processing container 134 is configured to hold the box 2400 fallen thereon. The sliding rail 135 is pivoted to the table 133 and located between the ingredient feeding box 1324 and the ingredient processing container 134, and the ingredient processing container 134 is pivoted to the sliding rail 135 and adapted to be turned over relative to the sliding rail 135. The cutter 136 is located above the ingredient processing container 134 and adapted to approach the ingredient processing container 134, so as to cut the box wrap 2300 on the boxes 2400 in the ingredient processing container 134.

The ingredient serving module 130 may further include a box disposal barrel 137, and the sliding rail 135 rotates relative to the table 133, such that the ingredient processing container 134 may approach the box disposal barrel 137; besides, the ingredient processing container 134 also rotates, such that the box 2400 in the ingredient processing container 134 falls into the box disposal barrel 137.

Besides, the ingredient serving module 130 may further include a first cleansing tank 138 and a plurality of nozzles 139 in the first cleansing tank 138. The first cleansing tank 138 is located below the sliding rail 135. As long as the box wrap 2300 is cut, the sliding rail 135 rotates relative to the table 133, such that the ingredient processing container 134 is located in the first cleansing tank 138, and that the nozzles 139 cleanse the ingredient processing container 134; thereby, the ingredients 2200 do not stay at the sliding rail 135 nor on the ingredient processing container 134 and thus do not change the taste of the food.

Figure 6:
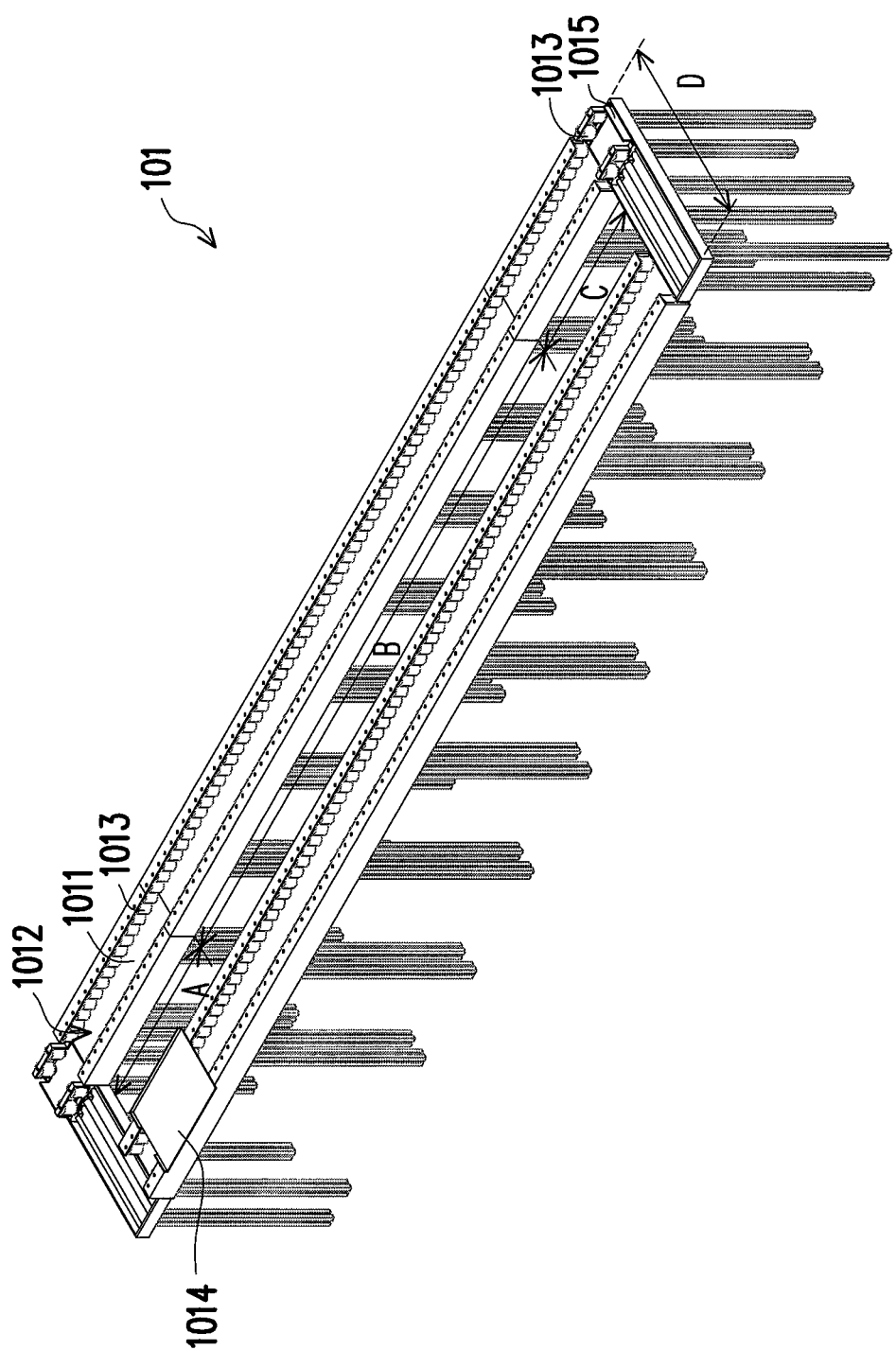
FIG. 6 is a schematic diagram illustrating a conveyer module.

FIG. 6 is a schematic diagram illustrating a conveyer module. With reference to FIG. 1 and FIG. 6, the conveyer module 101 includes a rail 1011 which has a bottom plate 1012. Here, the rail 1011 described in the present embodiment is a closed-loop rail with the closed loop. To be specific, the conveyer module 101 further includes a plurality of rollers 1013 arranged at two rows on two respective sides of the bottom plate 1012, and the axial direction of the rollers 1013 is perpendicular to the ground. Here, the rail 1011 may be divided into a plurality of regions. Rotational speed of the rollers 1013 in the same region stay unchanged, while the rotational speed of the rollers 1013 in different regions may vary.

Figure 11:
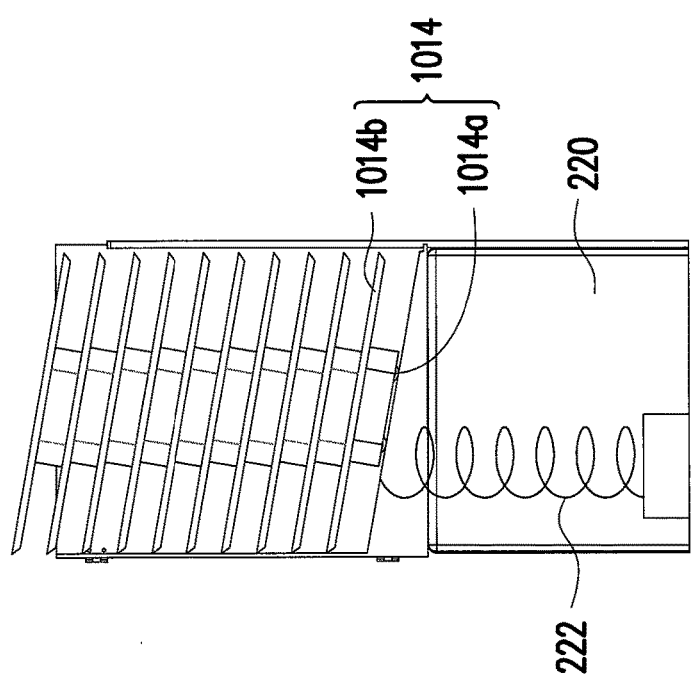
FIG. 11 is a schematic diagram illustrating transporting units stacked in a box.

The conveyer module 101 may further include a plurality of transporting units 1014, each of which includes at least one sliding wheel 1014a (as shown in FIG. 11) and a holding plate 1014*b* (as shown in FIG. 11) configured on the at least one sliding wheel 1014*a*. The structures (not shown) of the transporting units 1014 allows the transporting units 1014 to be sandwiched by the rollers 1013 arranged in two rows; therefore, the rolling action of the rollers 1013 may drive the sliding wheels 1014*a* of the transporting units 1014*a* to move along the rail 1011 on the bottom plate 1012 of the rail 1011. The holding plate 1014*b* serves to hold the vessels 150.

Figure 4D:
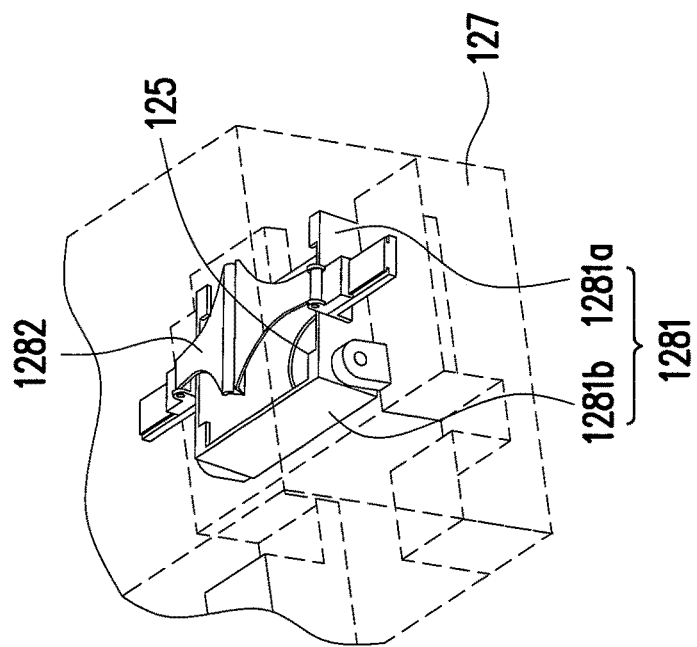
Figure 4C:
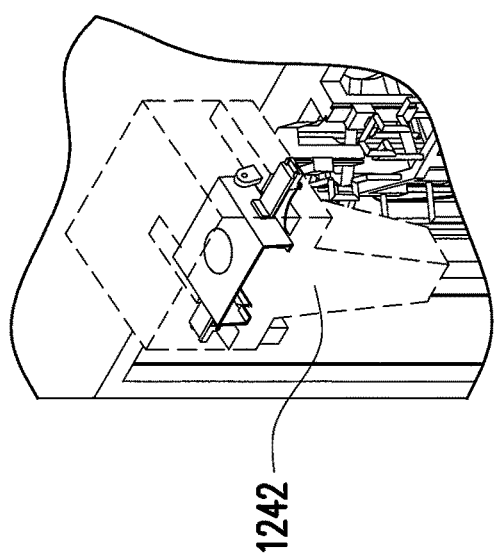

With reference to FIG. 1, when the automatic meal serving system 1 described in the present embodiment is applied, a central control computer may first select one of the foods 2000, e.g., noodles, green-bean noodles, rice noodles, and flat rice noodles. At this time, the transporting module 110 is driven to sequentially grab a dinner plate (not shown) and a bowl (not shown) and stack the dinner plate and the bowl onto the holding plate 1014*b* of the transporting unit 1014 located at a waiting area A. The central control computer then drives the rollers 1013 arranged at the waiting area A on two sides of the rail 1011 to roll, so as to move the transporting unit 1014 along the rail 1011. After the transporting unit 1014 moves away from the waiting area A to the first waiting area B (corresponding to the first food serving and heating module 120), the selected food 2000 is pushed out by the food and ingredient separating pusher 121, falls into the first portion 1241 of the ingredient feeding and guiding tank 124, and is guided to enter the holder 1281 of the packaging material removal module 128. After that, as shown in FIG. 4A and FIG. 4B, the packaging material 2100 is removed by the racks 1282, and the first side 1281*a* of the holder 1281 rotates along the second side 1281*b* of the holder 1281 as the rotation axis, so as to pour out the food 2000. Through the second portion 1242 of the ingredient feeding and guiding tank 124, the food 2000 falls into the food heating basket 1263 (shown in FIG. 7), as shown in FIG. 4C. Before or when the racks 1282 remove the packaging material 2100, the negative pressure supplying device 125 may absorb the packaging material 2100, so as to prevent the packaging material 2100 falls into the food heating basket 1263 when the holder 1281 is turned over to pour out the food 2000. As shown in FIG. 4D, the holder 1281 is further turned over in a backward manner, such that the packaging material 2100 falls into the packaging material collecting tank 127. Note that the step of removing the packaging material 2100 is not required if the food 2000 is not wrapped by the packaging material 2100.

Figure 7:
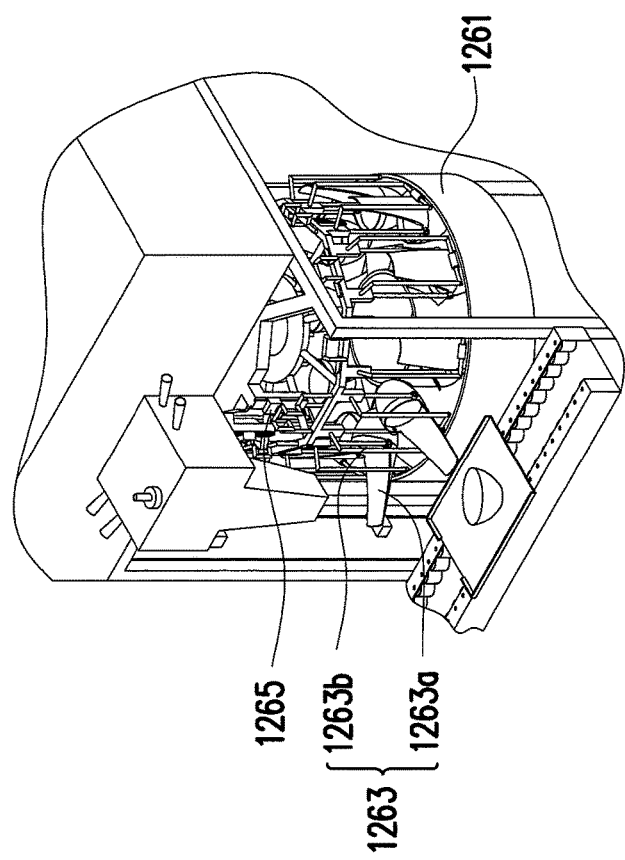
FIG. 7 schematically illustrates a step of feeding a bowl on a transporting unit with heated food.

With reference to FIG. 1, FIG. 6, and FIG. 7, after the food 2000 falls into the food heating basket 1263, the food heating basket 1263 may be held in an upright position due to the weight of the food 2000, and the basket portion 1263*b* of the food heating basket 1263 is submerged into the water of the water tank 1261, so as to heat the food 2000. Different people may order meals at different time, the ordered foods 2000 may vary, and the time required for heating different foods 2000 may vary as well. Hence, after the required time for heating each food 2000 is deemed sufficient, the rotator 1262 may be controlled to rotate the food heating basket 1263 to the corresponding bowl, and the movement of the sliding blocks 1265 is controlled, so as to pour the heated food 2000 from the food heating basket 1263 to the bowl on the transporting unit 1014 which waits for the heated food 2000 in the first waiting area B. Even though the transporting unit 1014 waits for the heated food 2000 in the first waiting area B, the transporting unit 1014 may not stop, and neither do the rollers 1013; instead, the transporting unit 1014 may slowly move forward, and the rollers 1013 may keep on rolling.

Whether the heated food 2000 is poured into the bowl may be sensed by a weight sensor (not shown) configured on the transporting unit 1014 (or the rail 1011), and the transporting unit 1014 keeps on moving forward and enters a second waiting area C (corresponding to the ingredient serving device 132).

Figure 8A:
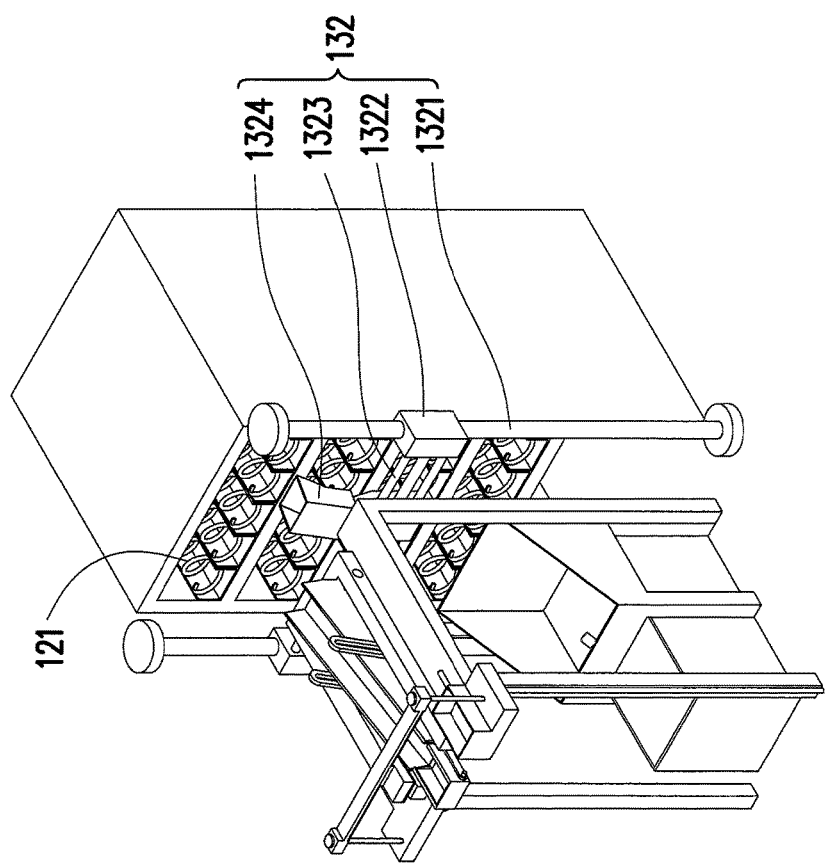
FIG. 8A to FIG. 8K are flowcharts showing operations of an ingredient serving module.
Figure 8C:
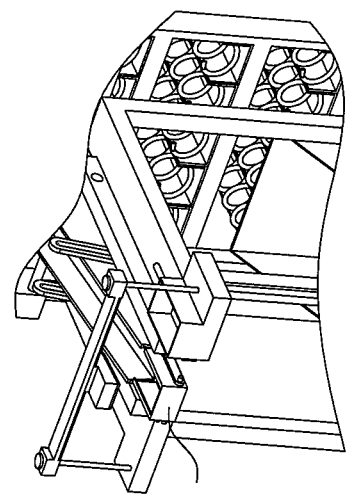
Figure 8B:
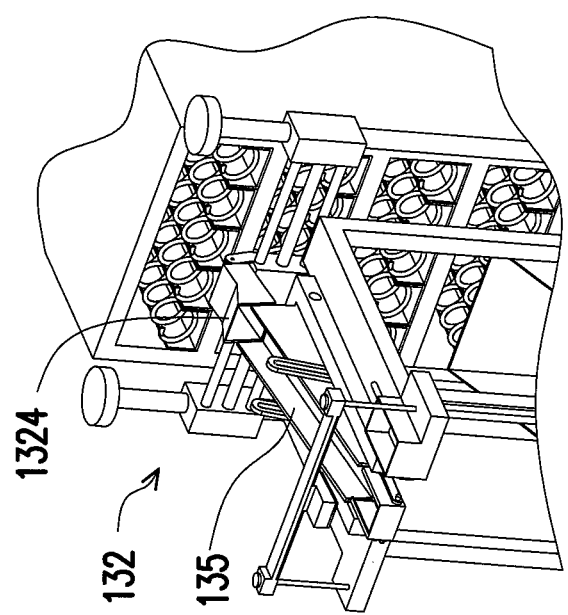
Figure 8E:
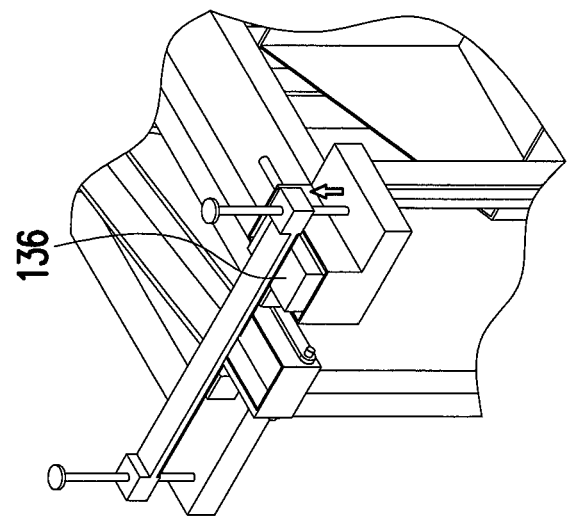
Figure 8D:
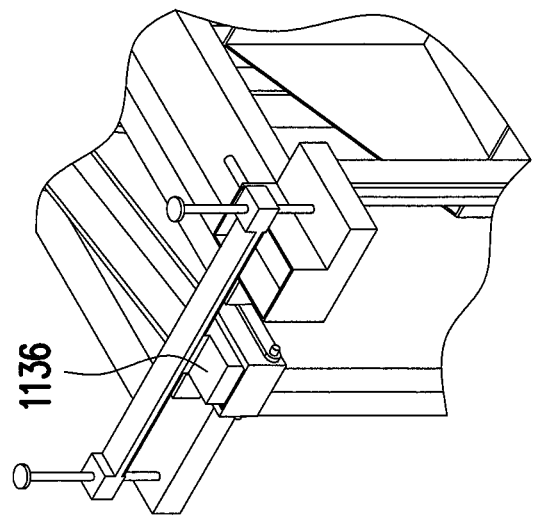
Figure 8G:
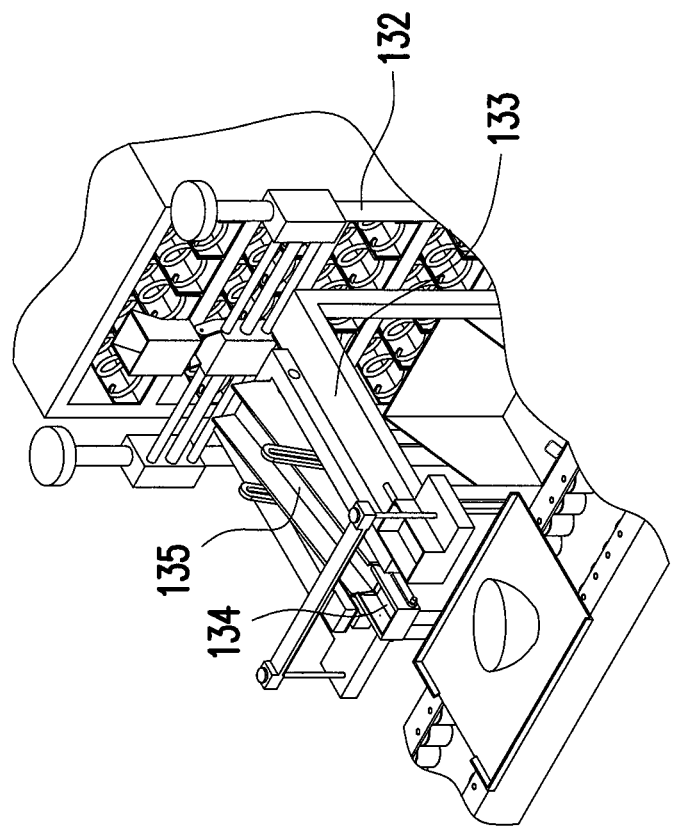
Figure 8F:
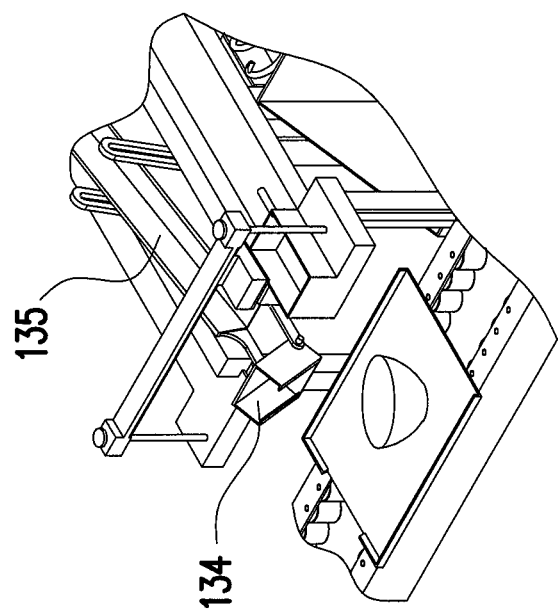
Figure 8I:
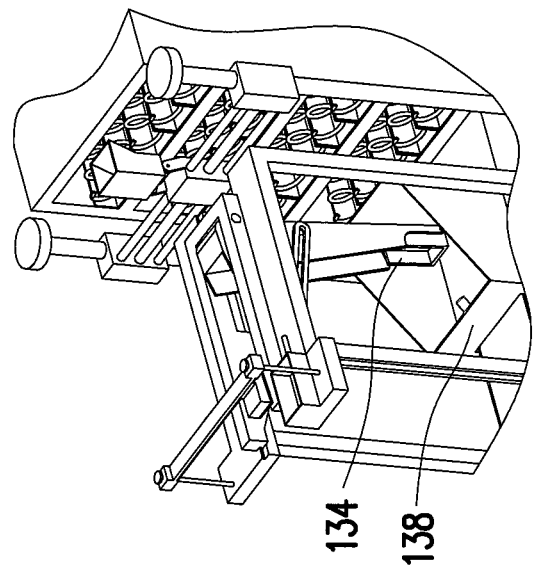
Figure 8H:
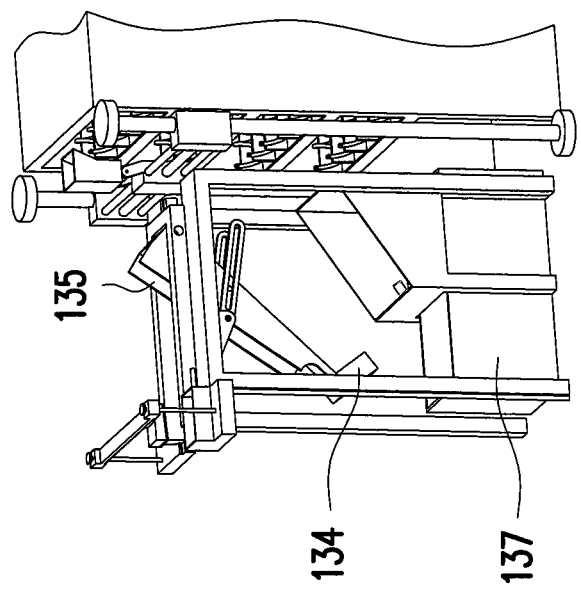
Figure 8K:
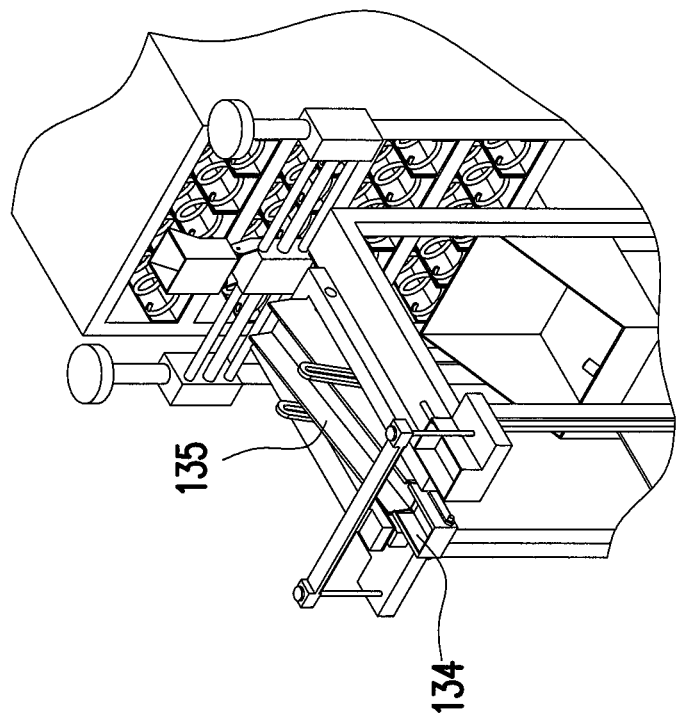
Figure 8J:
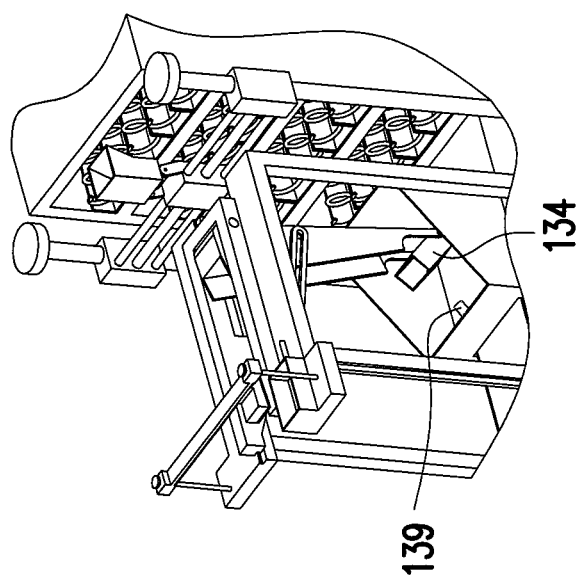

FIG. 8A to FIG. 8K are flowcharts showing operations of an ingredient serving module. With reference to FIG. 1 and FIG. 8A, once the order is received, the to-be-used ingredient 2200 is determined, and thus the horizontal shaft 1323 moves to the proper location on the vertical guiding post 1321, and the ingredient feeding box 1324 moves to the proper location on the horizontal shaft 1323. The food and ingredient separating pusher 121 in the ingredient serving tank 1311 may rotate at one revolution to push out one box 2400 containing the ingredient 2200, and the box 2400 falls into the ingredient feeding box 1324. As shown in FIG. 8B, the height of the ingredient feeding box 1324 is designed to be equal to the height of the entrance of the sliding rail 135, so as to place the box 2400 containing the ingredient 2200 onto the sliding rail 135. As shown in FIG. 8C, the box 2400 containing the ingredient 2200 falls into the ingredient processing container 134. As shown in FIG. 8D, the cutter 136 moves downward to approach the box 2400 and cuts the box wrap 2300 sealing the box 2400. As shown in FIG. 8E, after the box wrap 2300 is cut, the cutter 136 moves upward and away from the box 2400. As shown in FIG. 8F, the ingredient processing container 134 pivoted to the sliding rail 135 is turned over relative to the sliding rail 135, so as to pour the ingredient 2200 from the box 2400 to the bowl. As shown in FIG. 8G, once the ingredient processing container 134 is turned back to the original position, the sliding rail 135 moves relative to the table 133 to approach the ingredient serving device 132. As shown in FIG. 8H, the sliding rail 135 is turned downward relative to the table 133, and the ingredient processing container 134 may be further turned over, such that the empty box 2400 located at the ingredient processing container 134 falls into the box disposal barrel 137 and is directly recycled. As shown in FIG. 8I, the sliding rail 135 continuously rotates downward and enters the first cleansing tank 138; at the same time, the ingredient processing container 134 may rotate back to the original position. As shown in FIG. 8J, the nozzles 139 spray water onto the ingredient processing container 134, so as to remove the residual ingredient from the ingredient processing container 134. In this step, the ingredient processing container 134 may be further turned over, so as to be fully cleansed by the sprayed water. As shown in FIG. 8K, the ingredient processing container 134 and the sliding rail 135 are turned over back to the original position. The ingredients 2200 packaged in the box may be used in the noodles, the green-bean noodles, the rice noodles, the flat rice noodles, and so on, e.g., sesame sauce, Chinese bean paste, beef chunks, dumplings, etc. These ingredients 2200 are placed upon the actual demand.

Figure 9:
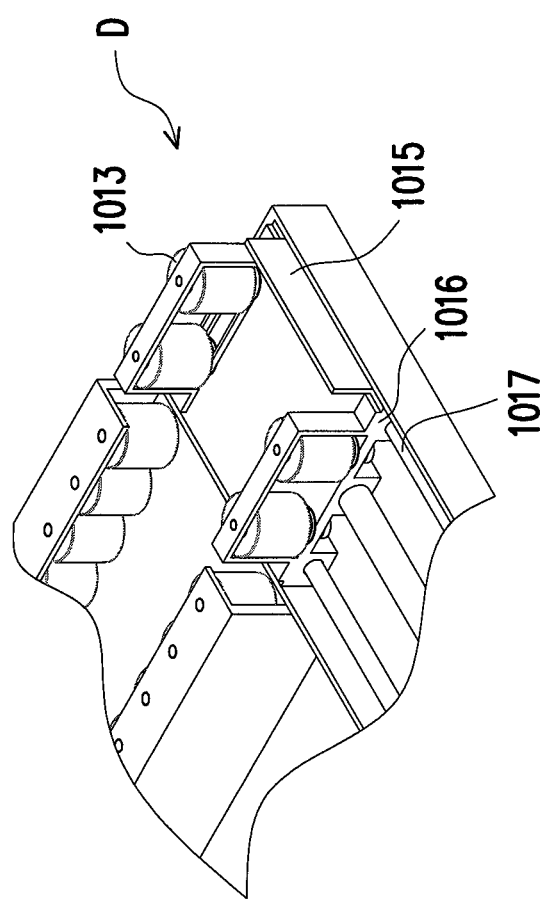
FIG. 9 is a schematic enlarged diagram illustrating a portion of a conveyer module.

FIG. 9 is a schematically enlarged diagram illustrating a portion of a conveyer module. With reference to FIG. 1, FIG. 6, and FIG. 9, after the ingredients 2200 are poured into the bowl, the meal is substantially done, and the transporting unit 1014 continuously moves forward on the rail 1011 to enter the meal pick-up area 140. In the present embodiment, the rail 1011 is a closed rail and may be designed to have a substantially rectangular shape. Certainly, the rail 1011 may have an elliptic shape. The area relatively away from the rail 1011 where the first food serving and heating module 120 and the ingredient serving module 130 are located may be defined as the meal pick-up area 140 because such area allows the customers to approach. The rollers 1013 in the transition area D, the first waiting area B, the second waiting area C, and the defined meal pick-up area 140 are individually and independently driven. When the transporting unit 1014 intends to enter the transition area D from the second waiting area C, the rotation speed of the roller 1013 in the second waiting area C is reduced, and the rotation direction of the roller 1013 in the transition area D is opposite to the rotation direction of the roller 1013 in the second waiting area C; alternatively, the rotation direction of the roller 1013 in the second waiting area C may be the same as the rotation direction of the roller 1013 in the transition area D, while the rotation speed of the roller 1013 in the transition area D is slower than the rotation speed of the roller 1013 in the second waiting area C. Thereby, the resultant friction may stop the transporting unit 1014. After the transporting unit 1014 stops, the roller 1013 in the transition area D stops rolling. Certainly, a blocking wall 1015 may be set in the transition area D, so as to prevent the transporting unit 1014 from moving out of the rail 1011 if the roller 1013 in the transition area D cannot stop the transporting unit 1014. The sliding blocks 1016 in the transition area D then move along a guiding shaft 1017, so as to move the transporting unit 1014 to the entrance of the meal pick-up area 140.

With reference to FIG. 1, when the transporting unit 1014 intends to enter the meal pick-up area 140 from the transition area D, the roller 1013 in the transition area D starts rotating in the same direction (opposite to the rotation direction of the rollers 1013 in the waiting area A, the first waiting area B, and the second waiting area C), so as to move the transporting unit 1014 to the meal pick-up area 140. Here, the rotation direction of the roller 1013 in the meal pick-up area 140 is the same as the rotation direction of the roller 1013 in the transition area D. The meal on the transporting unit 1014 in the meal pick-up area 140 can then be taken by the customer.

Note that the rotation direction of the roller 1013 in each area of the conveyer module 101 may be controlled by computer programs, such that the roller 1013 may continuously and slowly rotate to move the transporting unit 1014; alternatively, a stop point (not shown) may be defined in each area of the rail 1011. Once the transporting unit 1014 arrives at the stop point, the roller 1013 may stop rotating or may slowly rotate, such that the transporting unit 1014 may stop at the stop point or move forward in a slow manner to wait for the food 2000 or the ingredient 2200. After that, the weight or the location of the transporting unit 1014 may be sensed by a sensor (not shown) configured on the rail 1011, so as to further rotate the roller 1013 in the same region at the original speed or at a faster speed and/or stop the roller 1013 in the previous/next region, which will be determined upon the actual demand.

In the present embodiment, the transporting unit 1014 may be regularly located on the rail 1011 and may keep on moving on the closed rail 1011, and a weight sensor (not shown) may be further configured on the transporting unit 1014 or on the rail 1011, so as to determine whether any meal is placed in the vessel 150 on the transporting unit 1014. If yes, the first food serving and heating module 120 may skip the vessel 150 and pour the food 2000 to the next empty vessel 150; if no meal is sensed in the vessel 150, the first food serving and heating module 120 directly pour the food 2000 to the vessel 150. Similarly, according to the weight of the vessel 150 sensed by the sensor, the ingredient serving module 130 determines whether to pour the ingredient 2200 into the vessel 150 or not.

Second Embodiment

Figure 10:
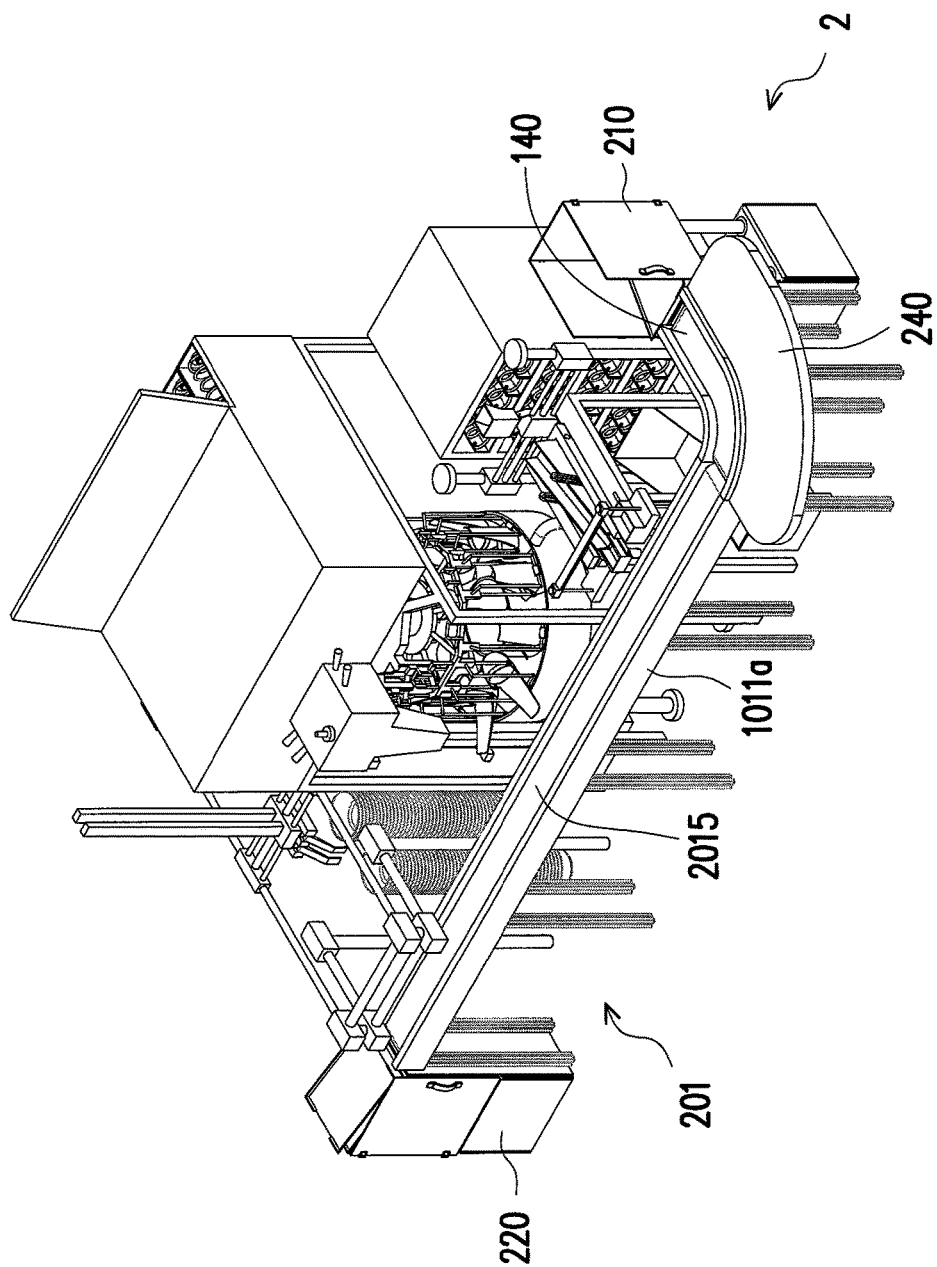
FIG. 10 is a schematic diagram illustrating an automatic meal serving system according to a second embodiment of the invention.

FIG. 10 is a schematic view illustrating an automatic meal serving system according to a second embodiment of the invention. The automatic meal serving system 2 described in the present embodiment is similar to the automatic meal serving system 1 described in the first embodiment, wherein the positions of the transporting module 110, the first food serving and heating module 120, and the ingredient serving module 130 are the same in these two embodiments. However, the configurations of the conveyer module 201 and the meal pick-up area 140 are different from those provided in the first embodiment.

Specifically, in the conveyer module 201 provided herein, the bottom plate 1012 that wraps the rail 1011 with a belt 2015 is applied to convey the transporting unit 1014, while the rollers 1013 located on two sides of the bottom plate 1012 at the rail 1011 are applied to convey the transporting unit 1014 in the first embodiment. In the present embodiment, the rail 1011 has two sidewalls 1011a located on two respective sides, and the sidewalls 1011a fix the belt 2015 between the sidewalls 1011a. In addition, the rail 1011 in the present embodiment is not a closed-loop type rail. The transporting units 1014 are placed at the entrance of the rail 1011, and a recycling stand 210 may be arranged at the exit of the rail 1011 for recycling the used transporting units 1014.

As shown in FIG. 10, a meal pick-up table 240 can be configured at the meal pick-up area 140 which adjoins the rail 1011, and the meal pick-up table 240 may be placed before the recycling stand 210. In addition, the transporting units 1014 at the entrance of the rail 1011 may be stacked together and placed into a box 220, as shown in FIG. 11. Upon the actual demand, a push-up component 222, e.g., a spring or a motor, may be configured at the bottom of the box 220, such that the transporting units 1014 can be easily taken out for use. Since the way to pour the foods 2000 and the ingredients 2200 into the vessels 150 on the transporting units 1014 is already explained in the first embodiment, no further description in this regard is provided hereinafter.

Third Embodiment

The present embodiment is similar to the first embodiment, while the difference therebetween lies in that the automatic meal serving system 3 further includes a second food serving and heating module 340 beside the conveyer module 301, and the ingredient serving module 130 is located between the second food serving and heating module 340 and the first food serving and heating module 120. People having ordinary skill in the art may modify the arrangement order and the locations of the ingredient serving module 130, the second food serving and heating module 340, and the first food serving and heating module 120 based on actual needs. For instance, the second food serving and heating module 340 may be configured between the ingredient serving module 130 and the first food serving and heating module 120. The simple changes to the locations of the first and second food serving and heating modules 120 and 340 and the ingredient serving module 130 are not shown in the drawings.

Figure 12:
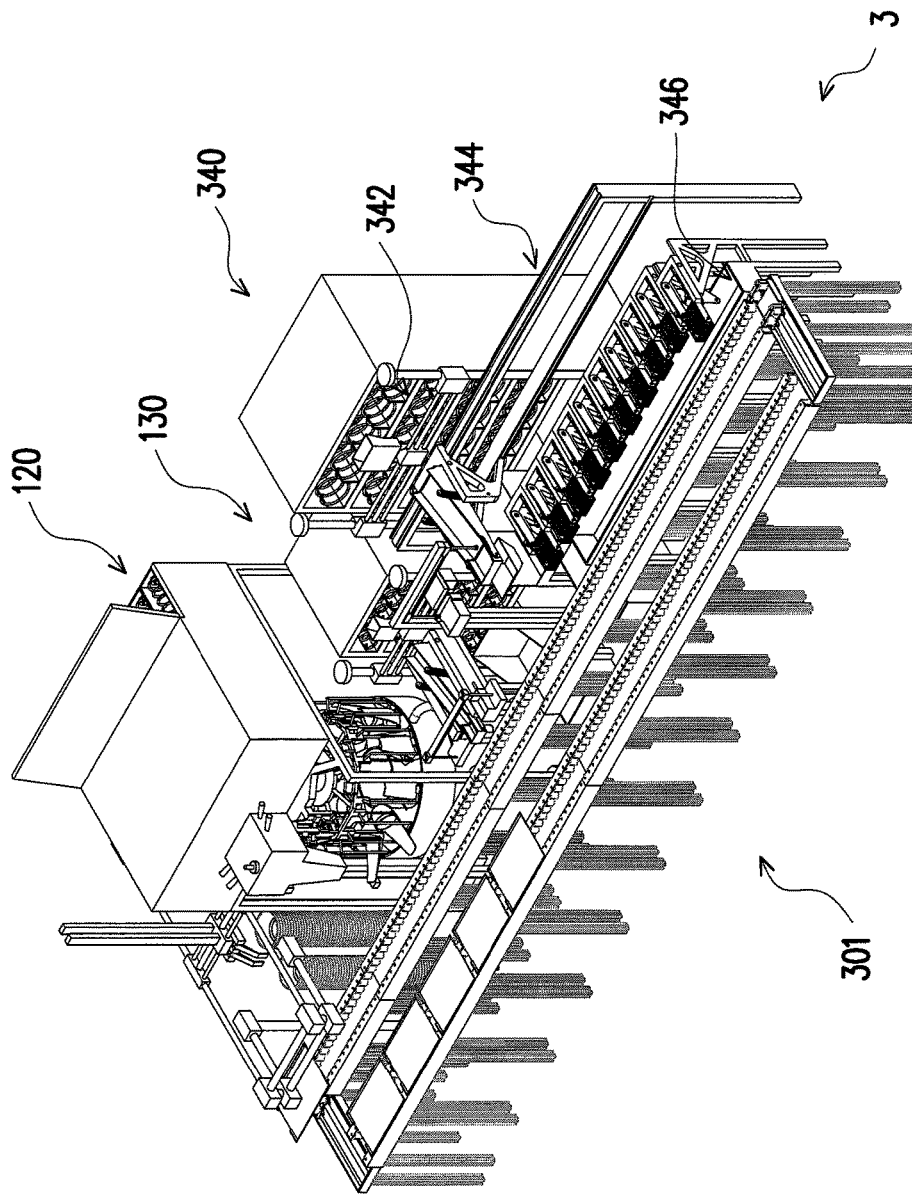
FIG. 12 is a schematic diagram illustrating an automatic meal serving system according to a third embodiment of the invention.
Figure 13:
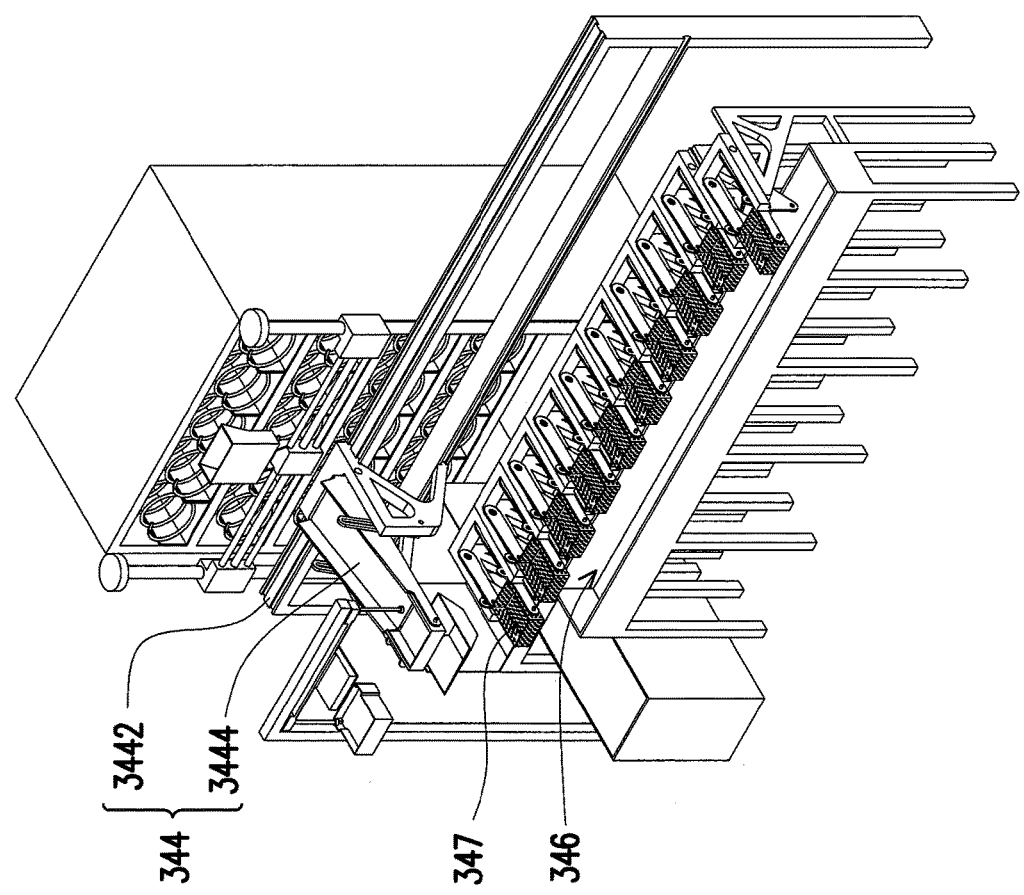
FIG. 13 is a schematic view illustrating a portion of the automatic meal serving system depicted in FIG. 12.

FIG. 12 is a schematic diagram illustrating an automatic meal serving system according to a third embodiment of the invention, and FIG. 13 is a schematic diagram illustrating a portion of the automatic meal serving system depicted in FIG. 12. With reference to FIG. 12 and FIG. 13, in the automatic meal serving system 4 provided in the present embodiment, the second food serving and heating module 340 includes a plurality of dumpling serving tanks 342, an ingredient feeding device 344, and a plurality of water-heating tanks 346. Each dumpling serving tank 342 has one kind of dumplings therein. The ingredient feeding device 344 includes a rack 3442 placed in front of the dumpling serving tanks 342 and an ingredient feeding member 3444 that can move relative to the rack 3442. The water-heating tanks 346 are located between the dumpling serving tanks 342 and the conveyer module 301, and the ingredient feeding member 3444 moves along the rack 3442, so as to feed one of the water-heating tanks 346 with the dumplings. In the present embodiment, the dumplings stored in the dumpling serving tanks 342 may be traditional dumplings, wontons, wontons in chili oils, or frozen hot-pot style dumplings, and these dumplings may be placed in boxes as well. Similarly, each dumpling serving tank 342 is controlled to remain at a constant temperature, so as to keep the dumplings fresh for a longer period of time.

The second food serving and heating module 340 further includes a plurality of dumpling cooking baskets 347, each of which is correspondingly configured above one of the water-heating tanks 346. Once the dumplings are fed into the dumpling cooking baskets 347 from the ingredient feeding device 344, the dumpling cooking baskets 347 are submerged into the water of the water-heating tanks 346, so as to heat the dumplings.

The configuration of the ingredient feeding device 344 is substantially the same as the ingredient serving device 132 provided in the first embodiment, which should however not be construed as a limitation to the invention. People having ordinary skill in the art may change the design based on actual needs as long as such change does not depart from the concept of designing the ingredient feeding device 344.

In another embodiment that is not shown, the ingredient serving module 130 and the second food serving and heating module 340 adjoin each other, and thus the ingredient serving device 132 and the ingredient feeding device 344 may be integrated together. For instance, there may be only one rack 3442 and an ingredient feeding member 344 (or the sliding rail 135) on the rack 3442, and the rack 3442 crosses over the ingredient serving module 130, the second food serving and heating module 340, and the water-heating tanks 346. The ingredient feeding member 344 may move back and forth on the rack 3442 to a proper location according to the actual needs, e.g., in front of the ingredient serving module 130, in front of the second food serving and heating module 340, or on the water-heating tanks 346.

In another embodiment that is not shown, the configuration of the second food serving and heating module 340 may be the same as that of the first food serving and heating module 120, and the second food serving and heating module 340 can also perform the heating function and serve dumplings.

Fourth Embodiment

Figure 14:
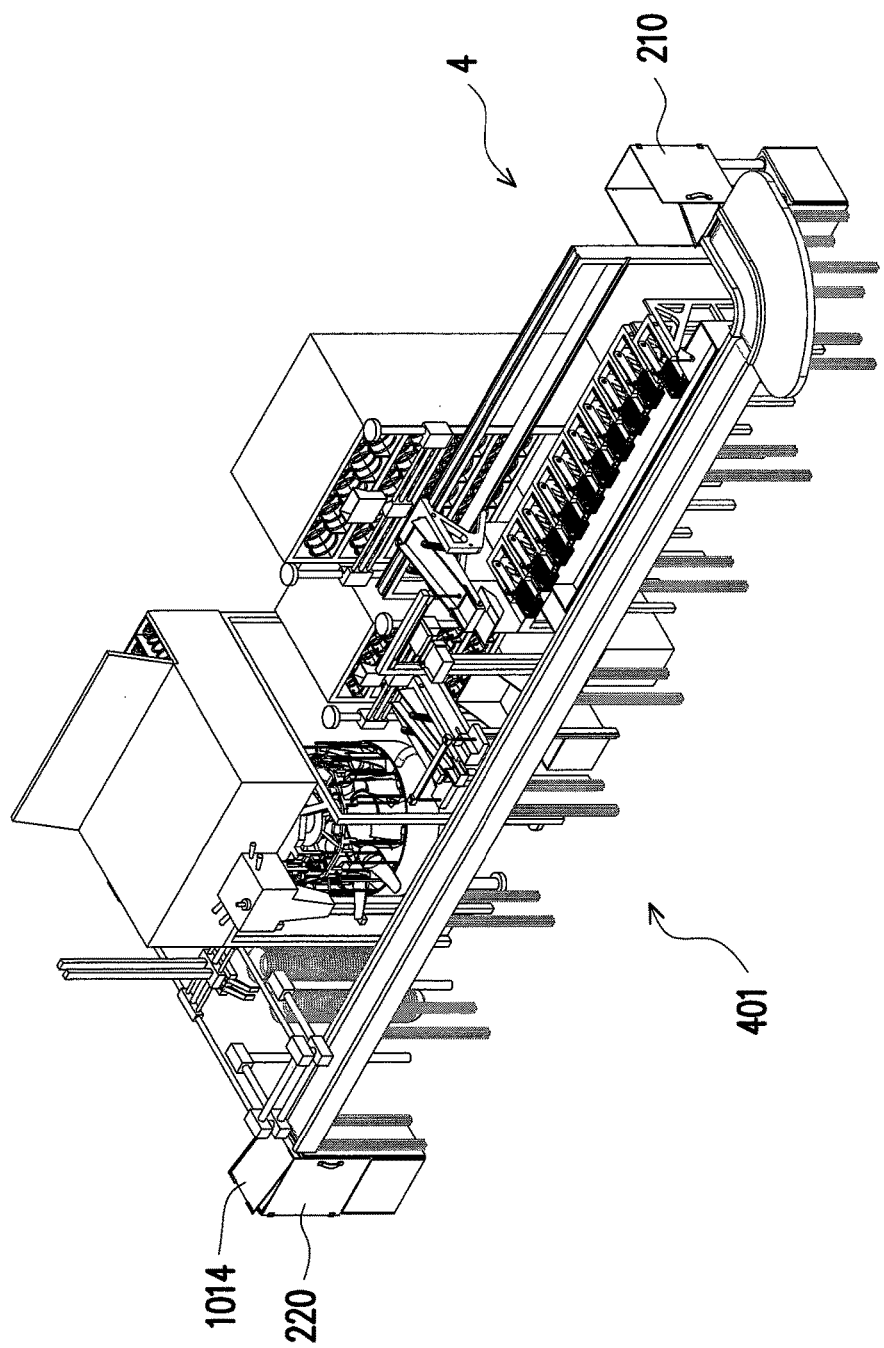
FIG. 14 is a schematic diagram illustrating an automatic meal serving system according to a fourth embodiment of the invention.

The present embodiment is similar to the third embodiment, while the difference therebetween lies in that the conveyer module 401 provided herein may be replaced by the conveyer module 201 provided in the second embodiment, as shown in FIG. 14. Hence, the recycling stand 210 and the boxes 220 that can accommodate the transporting units 1014 are applicable in the present embodiment.

Fifth Embodiment

Figure 15:
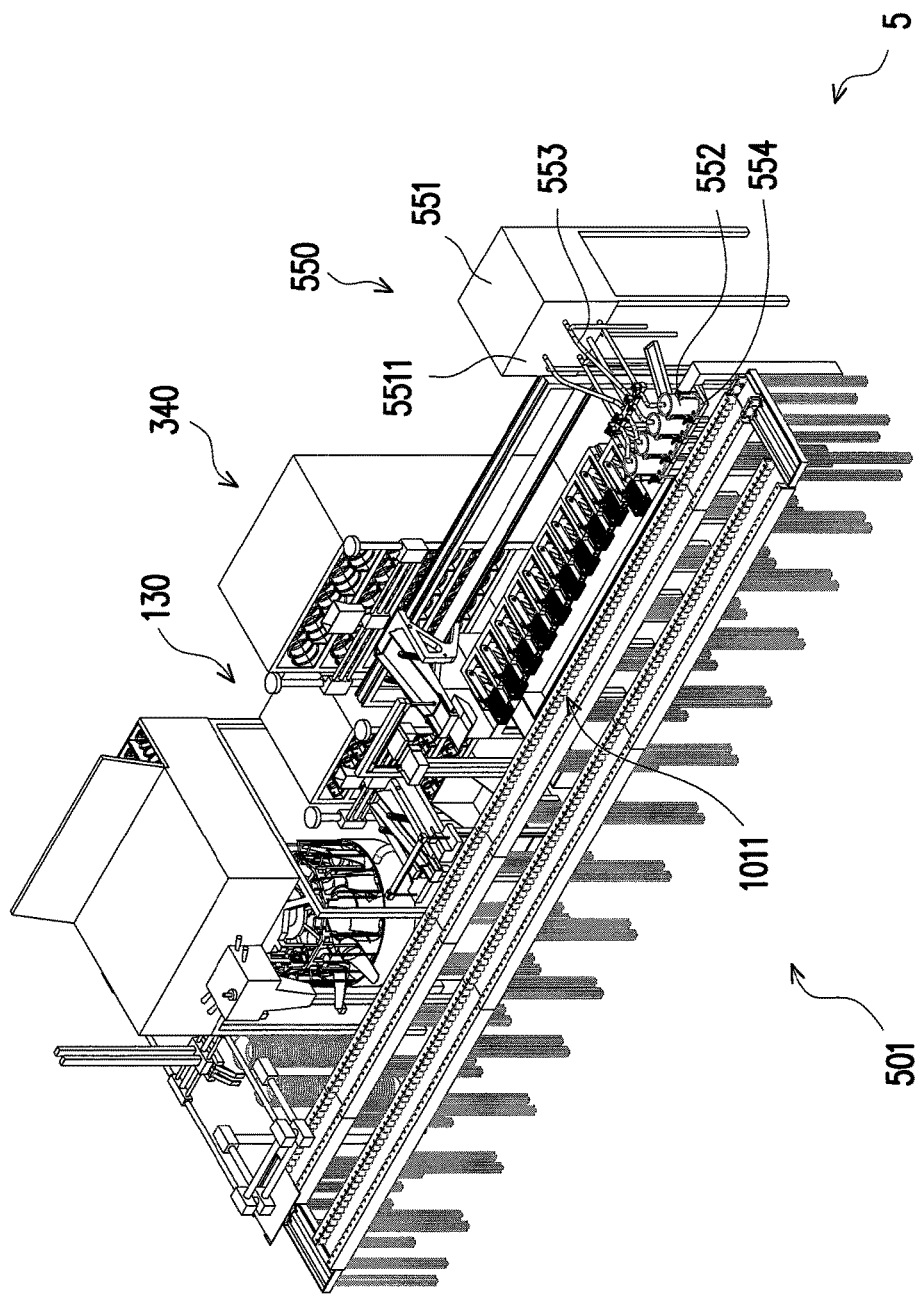
FIG. 15 is a schematic diagram illustrating an automatic meal serving system according to a fifth embodiment of the invention.

The present embodiment is similar to the third embodiment, while the difference therebetween lies in that the automatic meal serving system 5 further includes a soup serving module 550 located on a side of the ingredient serving module 130 and next to the conveyer module 501. Here, the soup serving module 550 adjoins the second food serving and heating module 340, as shown in FIG. 15. Although the automatic meal serving system 5 described in the present embodiment is equipped with all of the first food serving and heating module 120, the ingredient serving module 130, the second food serving and heating module 340, and the soup serving module 550, people having ordinary skill in the art may make modifications or select several of the above components according to actual needs, and the invention is not limited thereto.

With reference to FIG. 15, in the present embodiment, the soup serving module 550 includes a soup storage cabinet 551, a plurality of soup storage containers 552, a plurality of connection pipes 553, and a plurality of heaters 554. Here, the soup storage cabinet 551 has a plurality of soup storage tanks 5511, and the soup storage containers 552 are located between the soup storage cabinet 551 and the conveyer module 501. Each of the soup storage containers 552 is connected to the corresponding soup storage tank 5511 through one of the connection pipes 553 and correspondingly placed on one of the heaters 554. The heaters 554 may be induction cookers, for instance. The soup storage tanks 5511 may be controlled to remain at the constant temperature, so as to keep the soup fresh.

In the present embodiment, the automatic meal serving system 5 is equipped with the soup serving module 550, and thus the ingredients 2200 supplied by the ingredient serving module 130 may be dried ingredients. When the transporting unit 1014 on the rail 1011 arrives at the location corresponding to the soup serving module 550, soup is added to the vessel on the transporting unit 1014 according to the received order.

To be specific, each soup storage tank 5511 may be designed to have a drawer-like shape, and soup may be introduced into the soup storage containers 552 from the soup storage tanks 5511 through the connection pipes 553. The heaters 554 below the soup storage containers 552 may then heat the soup in the soup storage containers 552.

Sixth Embodiment

Figure 16:
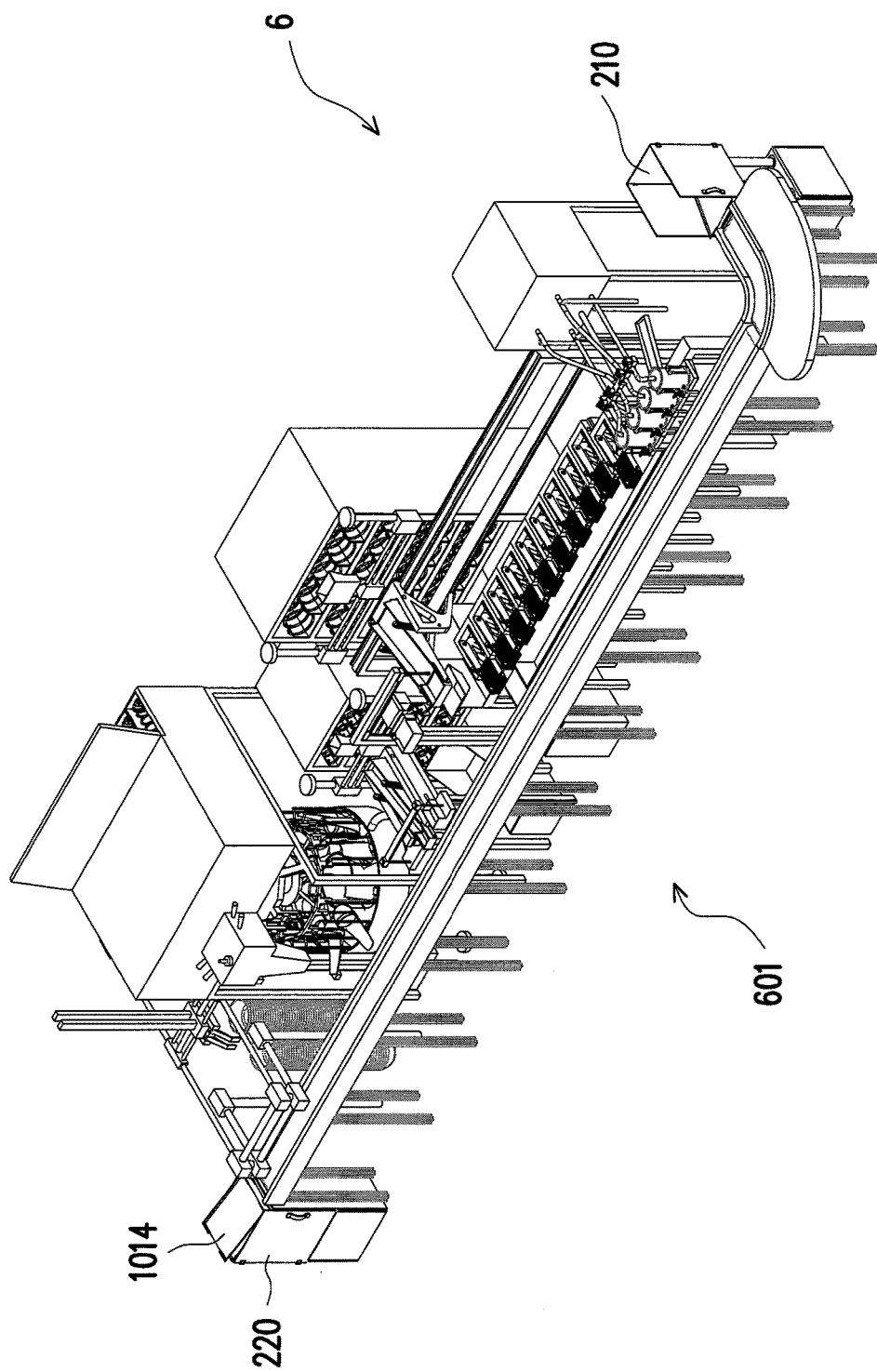
FIG. 16 is a schematic diagram illustrating an automatic meal serving system according to a sixth embodiment of the invention.

The present embodiment is similar to the fifth embodiment, while the difference therebetween lies in that the conveyer module 601 provided herein may be replaced by the conveyer module 201 provided in the second embodiment, as shown in FIG. 16. Hence, the recycling stand 210 and the boxes 220 that can accommodate the transporting units 1014 are applicable in the present embodiment.

Seventh Embodiment

Figure 17:
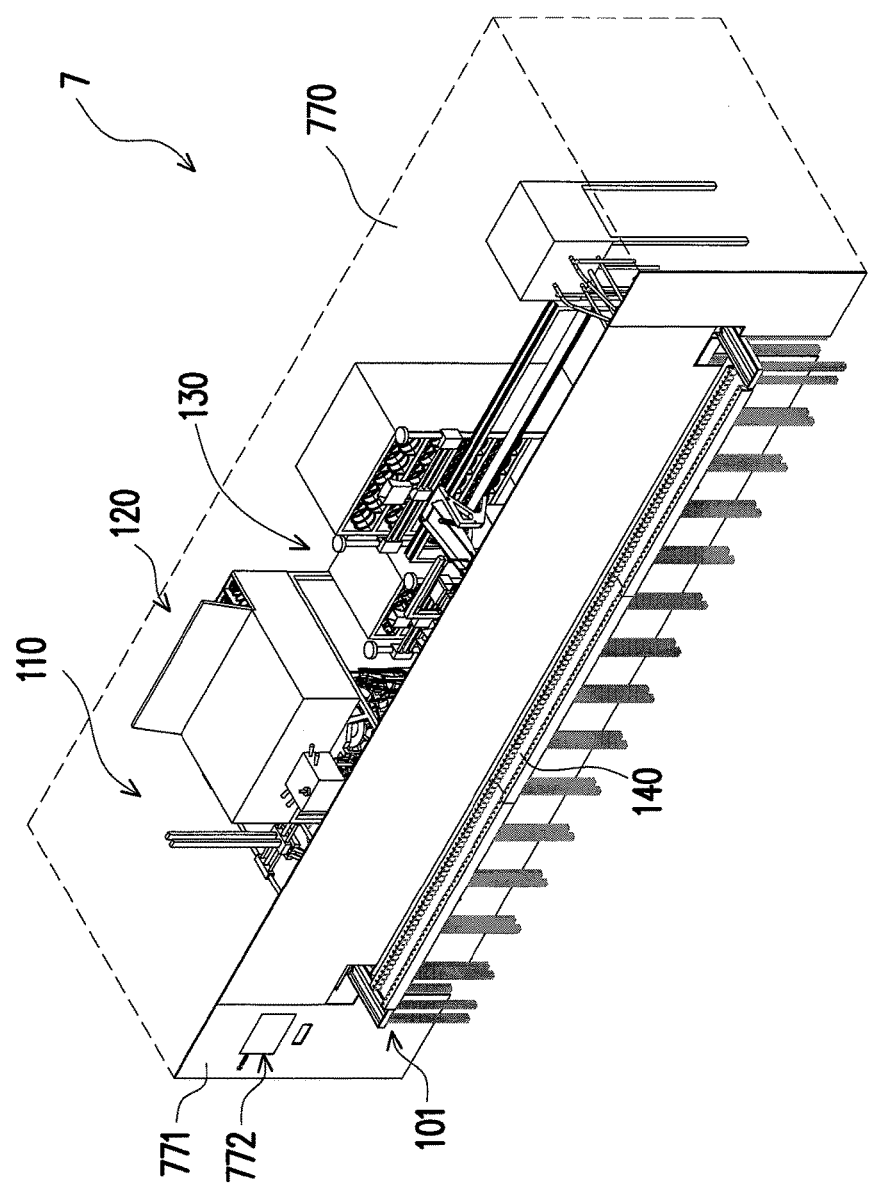
FIG. 17 is a schematic diagram illustrating an automatic meal serving system according to a seventh embodiment of the invention.
Figure 18:
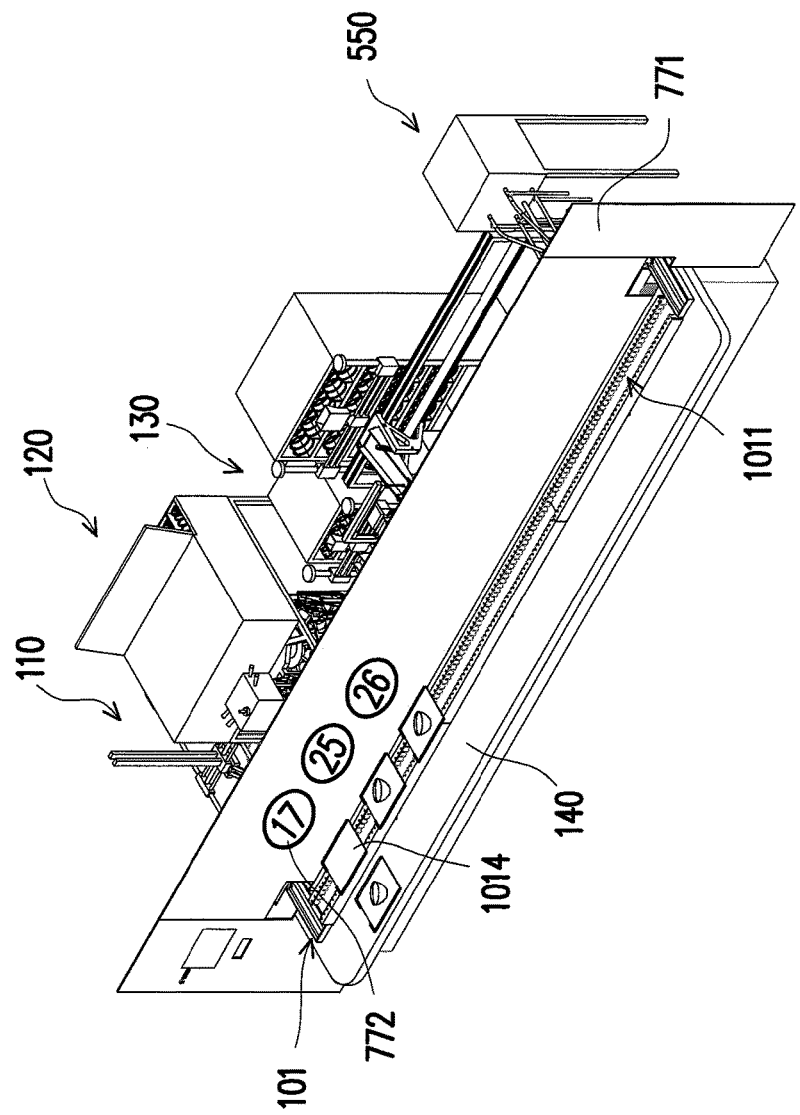
FIG. 18 shows a variation in the automatic meal serving system according to the seventh embodiment of the invention.

FIG. 17 is a schematic diagram illustrating an automatic meal serving system according to a seventh embodiment of the invention. With reference to FIG. 17, the difference between the present embodiment and the previous embodiments lies in that any of the automatic meal serving systems 1 to 6 respectively provided in the first to sixth embodiments may be selected and placed into one cooking chamber 770, and the meal pick-up area 140 is outside the cooking chamber 770 for easy pick-up. FIG. 18 shows a variation in the automatic meal serving system according to the seventh embodiment of the invention. With reference to FIG. 18, the meal pick-up area 140 and the rail 1100 may be independent from each other; thereby, the ready-to-go meals are placed in the meal pick-up area 140 for the customers and will not enter the cooking chamber 770 again once the transporting unit 1014 starts moving. For illustrative purposes, FIG. 18 simply shows the conveyer module 101, the transporting module 110, the first food serving and heating module 120, the ingredient serving module 130, the soup serving module 550, and the meal pick-up area 140; however, the invention is not limited thereto.

With reference to FIG. 17, the automatic meal serving system 7 may further include a food ordering machine 772 located around the first food serving and heating module 120, and the food ordering machine 772 is electrically connected to the first food serving and heating module 120, the ingredient serving module 130, the second food serving and heating module 340, the soup serving module 550, or a combination of several or all of the above. The food ordering machine 772 may be a display screen embedded to the outer wall 771 of the cooking chamber 770 or a vending machine independent from the cooking chamber 770. Other display devices 772 (shown in FIG. 18) may be further embedded to the outer wall 771, such as light emitting diode lamps or display panels that can be controlled by electricity, so as to individually display the meal pick-up number corresponding to each meal in the meal pick-up area 140.

Eighth Embodiment

Figure 19:
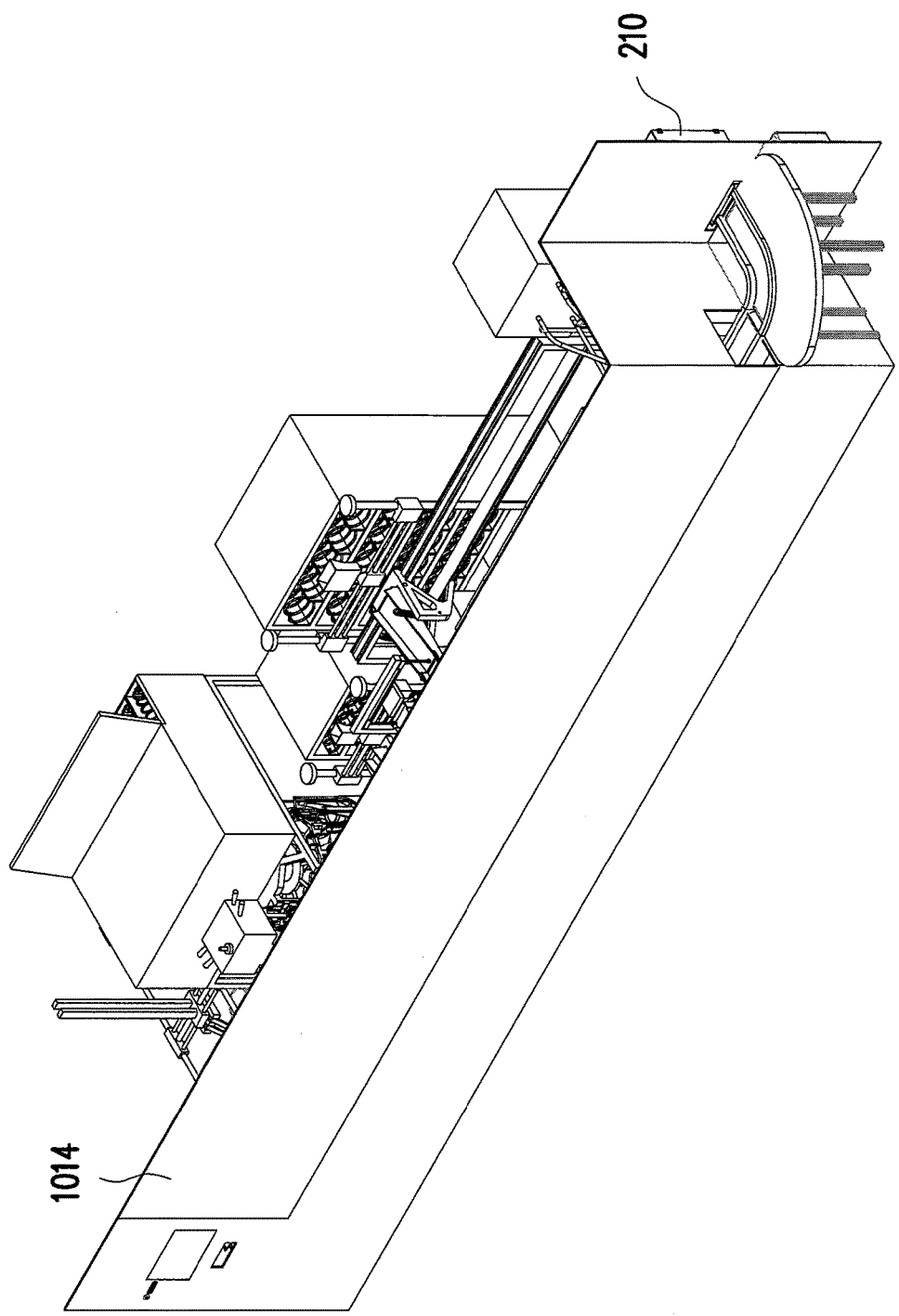
FIG. 19 is a schematic diagram illustrating an automatic meal serving system according to an eighth embodiment of the invention.

The present embodiment is similar to the seventh embodiment, while the difference therebetween lies in that the conveyer module provided herein may be replaced by the conveyer module 201 provided in the second embodiment, as shown in FIG. 19. Hence, the recycling stand 210 and the boxes (not shown) that can accommodate the transporting units 1014 are applicable in the present embodiment.

Ninth Embodiment

Figure 20:
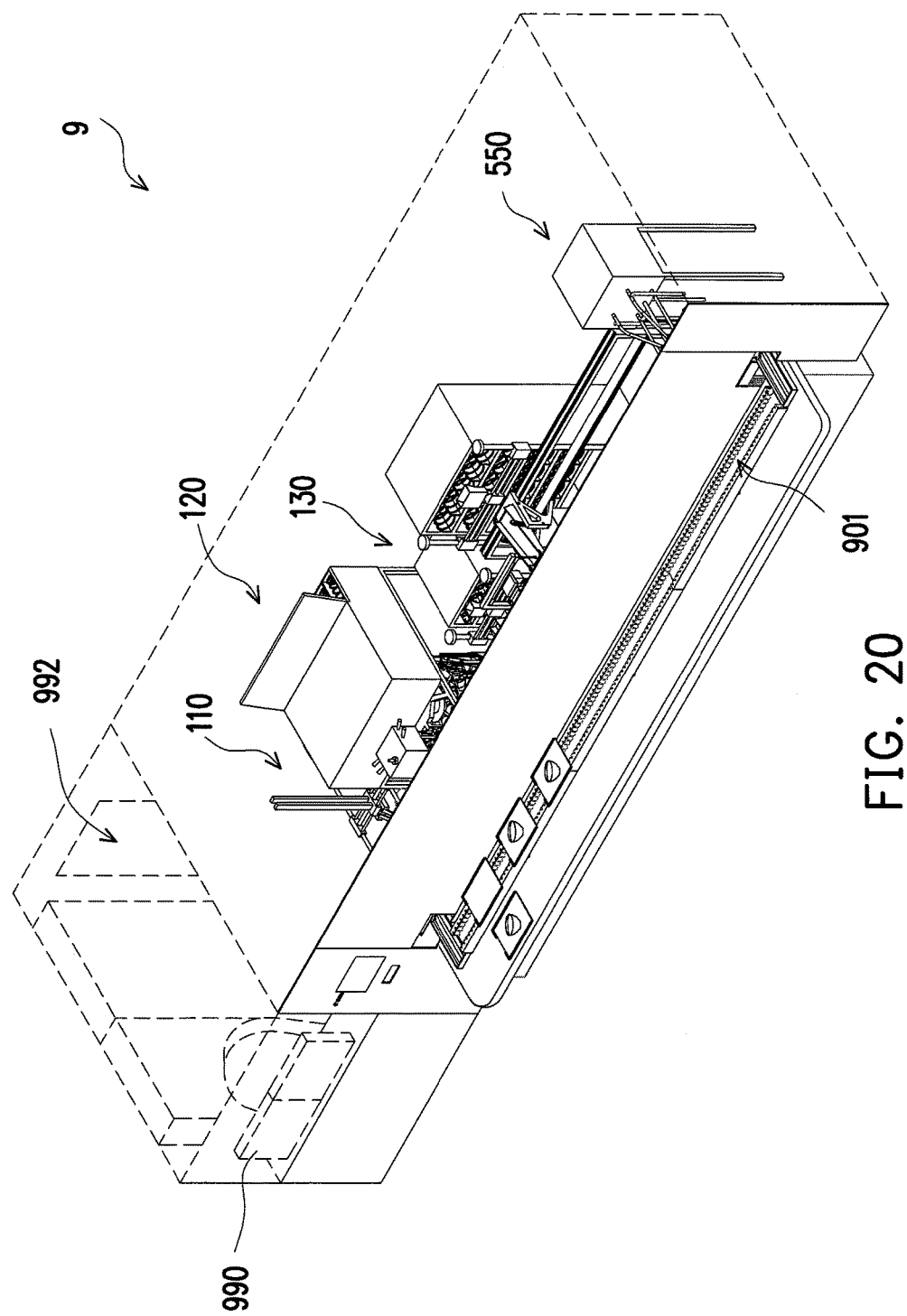
FIG. 20 is a schematic diagram illustrating an automatic meal serving system according to a ninth embodiment of the invention.

The present embodiment is similar to the seventh embodiment, while the difference therebetween lies in that the automatic meal serving system 9 further includes a central control room 900 in which a computer 992 is electrically connected to the conveyer module 901, the transporting module 110, the first food serving and heating module 120, the ingredient serving module 130, the second food serving and heating module 340, the soup serving module 550, or a combination of several or all of the above. Besides, people sitting in the central control room 900 may control and/or monitor the automatic meal serving system 9. Here, FIG. 20 simply illustrates the conveyer module 901, the transporting module 110, the first food serving and heating module 120, and the soup serving module 550. As shown in FIG. 20, the central control room 990 may be located beside the cooking chamber 770 for easy management or may manage the automatic meal serving system 9 through remote control (not shown).

To sum up, the automatic meal serving system capable of performing various functions allows the owner to select the actual required functions to be performed at will according to the estimated costs. Besides, no manpower is required in the entire process of heating the food and the ingredients and feeding the vessel with the heated food; therefore, the food and the ingredients are not touched by human beings during the entire process and can be protected from contamination, and the food safety can be secured. Labor costs can also be significantly reduced because no manpower but computer programs are required by the automatic meal serving system. Moreover, the automatic meal serving system can automatically arrange the order of serving the meals according to the preparation time of individual meals, such that customers are able to pick up their meals in an efficient manner.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An automatic meal serving system for serving diverse meals, the automatic meal serving system comprising:
a conveyer module;
a transporting module adapted for sequentially positioning a plurality of vessels on the conveyer module one by one;
a first food serving and heating module adapted for serving a variety of foods, heating one of the foods that is chosen, and feeding one of the vessels on the conveyer module with the heated food, the first food serving and heating module comprising:
at least one food serving tank, each of the at least one food serving tank having one of the foods therein;
an ingredient feeding and guiding tank, a front end of each of the at least one food serving tank being connected to the ingredient feeding and guiding tank; and
a heating unit placed below the ingredient feeding and guiding tank, the heating unit comprising:
a water tank adapted for providing hot water;
a rotator rotatably configured above the water tank; and
a plurality of food heating baskets connected to the rotator and arranged in a radial manner, one of the food heating baskets being aligned to the ingredient feeding and guiding tank, so as to receive the food from the ingredient feeding and guiding tank; and
an ingredient serving module located beside the first food serving and heating module, wherein the transporting module, the first food serving and heating module, and the ingredient serving module are sequentially located along the conveyer module.

2. The automatic meal serving system as recited in claim 1, wherein the conveyer module comprises a rail, and the rail has a bottom plate.

3. The automatic meal serving system as recited in claim 2, wherein the conveyer module further comprises a plurality of rollers arranged at two rows on two respective sides of the bottom plate.

4. The automatic meal serving system as recited in claim 2, wherein the conveyer module further comprises a belt, the rail has two sidewalls located on two respective sides, and the belt is located between the sidewalls and covers the bottom plate of the rail.

5. The automatic meal serving system as recited in claim 2, wherein the conveyer module further comprises a plurality of transporting units, each of the transporting units comprises at least one sliding wheel and a holding plate configured on the at least one sliding wheel, the at least one sliding wheel moves along the rail, and the holding plate is configured to hold the vessels.

6. The automatic meal serving system as recited in claim 1, wherein each of the at least one food serving tank has a food and ingredient separating pusher therein, and each of the foods in the same food serving tank is separated from each other by the food and ingredient separating pusher.

7. The automatic meal serving system as recited in claim 1, wherein each of the at least one food serving tank is controlled to remain at a constant temperature.

8. The automatic meal serving system as recited in claim 1, further comprising a plurality of lifting members, each of the food heating baskets being connected to the rotator through one of the corresponding lifting members, and movement of each of the lifting members relative to the rotator drives the corresponding one of the food heating baskets to be in an upright or inclined position.

9. The automatic meal serving system as recited in claim 1, wherein the first food serving and heating module further comprises a packaging material removal module configured in the ingredient feeding and guiding tank, and the packaging material removal module comprises:
 a holder adapted for holding the food entering the ingredient feeding and guiding tank, the holder having a first side and a second side, the second side being pivoted to the ingredient feeding and guiding tank, such that the first side is adapted for rotating along the second side as a rotation axis; and
 a pair of rakes located at two respective sides of the holder, wherein if each of the foods is wrapped by a packaging material, the pair of rakes is adapted for stripping off the packaging material wrapping the food located on the holder.

10. The automatic meal serving system as recited in claim 9, further comprising a negative pressure supplying device configured below the holder for providing a negative pressure to absorb the packaging material wrapping the chosen food when the holder holds the chosen food.

11. The automatic meal serving system as recited in claim 1, wherein the ingredient serving module comprises:
 an ingredient serving cabinet having ingredient serving tanks arranged in columns and rows, ingredients of a same type packaged in one box being placed in respective ingredient serving tanks, a box wrap being configured to seal the ingredients of the same type into the box;
 an ingredient serving device comprising:
 a pair of vertical guiding posts configured in front of the ingredient serving cabinet;
 a pair of sliding blocks, the pair of guiding posts being inserted into the pair of sliding blocks;
 at least one horizontal shaft passing through the pair of sliding blocks;
 an ingredient feeding box configured on the horizontal shaft;
 a table located between the conveyer module and the ingredient serving cabinet;
 an ingredient processing container configured to hold the box;
 a sliding rail pivoted to the table and located between the ingredient feeding box and the ingredient processing container, the ingredient processing container being pivoted to the sliding rail and adapted to be turned over relative to the sliding rail; and
 a cutter located above the ingredient processing container and adapted to approach the ingredient processing container, so as to cut the box wrap on the box in the ingredient processing container.

12. The automatic meal serving system as recited in claim 11, wherein the ingredient serving cabinet is controlled to remain at a constant temperature.

13. The automatic meal serving system as recited in claim 11, wherein the ingredient serving module further comprises a cleansing tank and a plurality of nozzles in the cleansing tank, the cleansing tank is located below the sliding rail, the sliding rail rotates relative to the table, such that the ingredient processing container is located in the cleansing tank, and the nozzles cleanse the ingredient processing container.

14. The automatic meal serving system as recited in claim 1, further comprising a second food serving and heating module located between the ingredient serving module and the first food serving and heating module, or the ingredient serving module being located between the first food serving and heating module and the second food serving and heating module, wherein the second food serving and heating module comprises:
 a plurality of dumpling serving tanks, each of the dumpling serving tanks having one kind of dumplings therein;
 an ingredient feeding device comprising:
 a rack placed in front of the dumpling serving tanks;
 an ingredient feeding member configured on the rack, the ingredient feeding member being movable relative to the rack; and
 a plurality of water-heating tanks located between the dumpling serving tanks and the conveyer module, the ingredient feeding member moving along the rack, so as to feed one of the water-heating tanks with the dumplings.

15. The automatic meal serving system as recited in claim 1, further comprising a soup serving module, wherein along the conveyer module, the first food serving and heating module is arranged in the first while the order of the ingredient serving module, the soup serving module, and the second food serving and heating module are changeable.

16. The automatic meal serving system as recited in claim 15, wherein the soup serving module comprises:
 a soup storage cabinet having a plurality of soup storage tanks;
 a plurality of soup storage containers configured between the soup storage cabinet and the conveyer module;
 a plurality of connection pipes, each of the soup storage containers being connected to one of the corresponding soup storage tanks through one of the connection pipes; and
 a plurality of heaters, each of the soup storage containers being correspondingly placed on one of the heaters.

17. The automatic meal serving system as recited in claim 1, wherein the transporting module comprises:
 a shelf placed next to the first food serving and heating module and the conveyer module, the vessels being placed below the shelf; and
 a clamping claw placed on the shelf and adapted for moving horizontally along the shelf and vertically relative to the shelf, so as to sequentially place the vessels to the conveyer module.

* * * * *